US008925517B2

(12) United States Patent
Adams

(10) Patent No.: US 8,925,517 B2
(45) Date of Patent: Jan. 6, 2015

(54) GAS-POWERED TOOL MOTOR

(76) Inventor: Joseph S. Adams, British Columbia (CA)

( * ) Notice: Subject to any disclaimer, the term of this patent is extended or adjusted under 35 U.S.C. 154(b) by 390 days.

(21) Appl. No.: 13/138,957

(22) PCT Filed: Oct. 22, 2010

(86) PCT No.: PCT/CA2010/001683
§ 371 (c)(1),
(2), (4) Date: Nov. 2, 2011

(87) PCT Pub. No.: WO2011/047485
PCT Pub. Date: Apr. 28, 2011

(65) Prior Publication Data
US 2012/0210974 A1    Aug. 23, 2012

(51) Int. Cl.
| F02B 19/10 | (2006.01) |
| B23Q 5/033 | (2006.01) |
| F01B 11/00 | (2006.01) |
| F02B 19/14 | (2006.01) |
| F02B 63/02 | (2006.01) |
| F01L 3/00  | (2006.01) |

(52) U.S. Cl.
CPC .............. *B23Q 5/033* (2013.01); *F01B 11/007* (2013.01); *F02B 19/1028* (2013.01); *F02B 19/14* (2013.01); *F02B 63/02* (2013.01); *F01L 2003/25* (2013.01); *Y02T 10/125* (2013.01)
USPC ........... 123/258; 123/253; 123/257; 123/286; 123/289; 123/292; 123/90.1

(58) Field of Classification Search
USPC ...... 123/46 R–46 H, 190.1–190.15, 253, 257, 123/258, 286, 289, 292
See application file for complete search history.

(56) References Cited

U.S. PATENT DOCUMENTS

| 4,365,471 A | 12/1982 | Adams |
| 4,721,240 A | 1/1988 | Cotta |
| 4,773,581 A | 9/1988 | Ohtsu et al. |
| 6,976,464 B2 * | 12/2005 | Crall ......................... 123/190.1 |
| 7,261,070 B2 * | 8/2007 | Jones et al. ............... 123/46 SC |
| 7,328,680 B1 * | 2/2008 | Diamond ................. 123/190.14 |
| 8,646,671 B2 * | 2/2014 | Adams ........................... 227/10 |
| 2002/0144498 A1 | 10/2002 | Adams |
| 2006/0196455 A1 * | 9/2006 | Jones et al. ............... 123/46 SC |
| 2009/0025673 A1 | 1/2009 | Adams |
| 2009/0159050 A1 * | 6/2009 | Adams ....................... 123/46 SC |

FOREIGN PATENT DOCUMENTS

WO    WO 2009/088896    7/2009

* cited by examiner

*Primary Examiner* — Thomas Moulis
*Assistant Examiner* — Joseph Dallo
(74) *Attorney, Agent, or Firm* — Steven W. Weinrieb

(57) ABSTRACT

A gas-powered tool motor includes a combustion chamber with an intake valve at one end, an exhaust valve at another end, and a control plate or control valve between two portions of the combustion chamber. A piston or other positive displacement device is in communication with the combustion chamber. The intake and exhaust valves have closure members that are movable along a common axis in tandem between collective open positions for recharging the combustion chamber with the fuel and air mixture and collective closed positions for detonating the fuel and air mixture in the combustion chamber and displacing the positive displacement device. The control plate or control valve supports limited air flows from a first portion of the combustion chamber to a second portion of the combustion chamber even in the closed position of the control valve for supporting two-stage combustion.

30 Claims, 25 Drawing Sheets

FIG. 7

GAS-POWERED TOOL MOTOR

CROSS-REFERENCE TO RELATED APPLICATIONS

This application is a non-provisional application claiming domestic priority to U.S. Provisional Application No. 61/254,275 filed on Oct. 23, 2009 and U.S. Provisional Application No. 61/347,052 filed on May 21, 2010. Both identified provisional applications are hereby incorporated by reference.

TECHNICAL FIELD

The invention relates to linear motors, particularly for use in gas-powered tools such as for driving fasteners, launching projectiles, or performing other useful work, and to combustion systems for such motors and associated controls.

BACKGROUND

Some gas-powered tools with spark-ignitions have two part combustion chambers: a pre-combustion chamber and a main combustion chamber. Ignition originates in the pre-combustion chamber. Some unburned fuel and air in the pre-combustion chamber is forced ahead of a flame jet into the main combustion chamber. Upon arrival, the flame jet triggers combustion of a compressed fuel and air mixture in the main combustion chamber. The detonation (combustion) in the main combustion chamber drives a piston or performs other useful work, such as launching a projectile.

When a combustion cycle is initiated, both the pre-combustion chamber and the main combustion chamber are charged with a mixture of fuel and air, and the pre-established mixture within the pre-combustion chamber is then ignited. Ideally, a generated flame front propagates through the pre-combustion chamber so as to push unburned fuel and air in front of it toward the main combustion chamber, thereby further mixing and compressing the fuel and air in the main combustion chamber. In some designs, a check valve regulates flows between the pre-combustion chamber and the main combustion chamber so as to permit the unburned fuel and air and the flame front to enter the main combustion chamber from the pre-combustion chamber but to limit any reverse flow of combustion products from the main combustion chamber back into the pre-combustion chamber. As the flame front enters the main combustion chamber, it ignites the compressed fuel and air mixture disposed within the main combustion chamber. Elevated combustion pressure within the main combustion chamber leads to a more efficient combustion within the main combustion chamber, and such elevated pressures can more effectively and powerfully perform useful work, such as driving of fasteners with combustion-powered fastener-driving tools.

Generally, for purposes of (a) recharging the pre-combustion and main combustion chambers with mixtures of fuel and air and (b) discharging exhaust gases from the combustion chambers, a bypass passageway controlled by a bypass valve interconnects the pre-combustion and main combustion chambers. During recharging, the fuel air mixture enters the pre-combustion chamber through an intake valve and reaches the main combustion chamber through the bypass passageway. During discharging, exhaust gases in the pre-combustion chamber enter the main combustion chamber through the bypass passageway and exit the main combustion chamber through an exhaust valve. The bypass valve is opened for purposes of recharging or discharging the combustion chambers, but is closed during combustion.

Other designs with two-stage combustion chambers (i.e., a pre-combustion chamber and a main combustion chamber) provide a control wall between the chambers with limited size orifices through the wall. The orifices allow flame jets to pass from the pre-combustion chamber to the main combustion chamber for detonating the fuel/air mix in the main combustion chamber while providing a wall for reflecting compression waves within the main combustion chamber in a direction for accomplishing work.

Check valves that are free-flowing in both directions at low pressure values been envisioned for controlling flows between the pre-combustion and main combustion chambers. The recharging and discharging operations take place at the relatively low pressure values at which the check valves are free flowing.

The bypass valves add to the design complexity of linear motors by requiring the opening and closing of the bypass valve in response to different stages in the combustion cycle of the motor including recharging (open), detonating (closed), and discharging (open). Limited orifices through control walls, whether regulated by check valves or not, tend to impose restrictions on the free flow of gasses between the chambers and can result in reduced charging and discharging efficiencies.

SUMMARY OF THE INVENTION

Among its preferred embodiments, the invention features an integrated valving and combustion control system, which facilitates the operation of gas-powered hand tools with two-stage combustion chambers such as may be used to drive fasteners, launch projectiles, or perform other useful work. A common mechanical tie links operations of an intake valve for regulating the intake of gases into a pre-combustion chamber and an exhaust valve for regulating the discharge of gases from a main combustion chamber. A control plate limits the flow of gases between the two combustion chambers. Building upon the common mechanical linkage, which allows for the intake and exhaust valves to be operated in tandem, the cost and complexity of the control system can be reduced, the reliability of the control system can be increased, and better control can be provided for matching output force to tool specifications.

One version of the invention as an integrated valving and combustion control system for a gas-powered hand tool includes a combustion chamber having a pre-combustion chamber and a main combustion chamber. An intake valve regulates flows into the pre-combustion chamber. A control plate with one or more openings supports limited flows between the pre-combustion combustion chamber and the main combustion chamber. An exhaust valve regulates flows out of the main combustion chamber. A tie mechanically interconnects the intake and exhaust valves for opening and closing the valves.

Preferably, the intake valve includes an intake closure member and the exhaust valve includes an exhaust closure member, and the tie provides for moving the intake and exhaust closure members along a common axis for opening and closing the valves. The tie moves together with the closure members in one direction along the common axis for opening the intake and exhaust valves and moves together with the closure members in an opposite direction along the common axis for closing the intake and exhaust valves.

The control plate can be connected to the tie and moved together with the intake and exhaust closure members along the common axis or the control plate can be fixed to the housing with the tie passing through the control plate. Particularly for higher power applications, the control plate is preferably formed at least in part by a control closure member of a control valve. The tie moves the control closure member together with the intake and exhaust closure members along the common axis for opening and closing the intake, control and exhaust valves. The control valve that has an open position and a closed position. In the closed position, the control valve supports the limited flows between the pre-combustion combustion chamber and the main combustion chamber. In the open position, the control valve supports less restricted flows of air from the pre-combustion chamber to the main combustion chamber. The less restrictive flows of air supported by the open position of the control valve obviate the need for a conventional bypass valve.

The control valve has an open position and a closed position and in the closed position still allows limited air flows from the pre-combustion chamber to the main combustion chamber. For example, one or more openings can be formed through the control valve to support the limited air flows from the pre-combustion chamber to the main combustion chamber in the closed position of the control valve. Alternatively, the control valve can be formed with a check valve that supports the limited air flows from the pre-combustion chamber to the main combustion chamber in the closed position of the control valve while blocking similar air flows from the main combustion chamber to the pre-combustion chamber.

That is, even in a closed position, the control valve preferably allows limited flows from the pre-combustion chamber to the main combustion chamber for supporting multi-stage combustion within the combustion chamber. The limited flows can be supported by openings, e.g., gaps or orifices, through the closed control valve or by a check valve that is biased to allow flows from the pre-combustion chamber to the main combustion chamber but blocks a reverse direction of flows from the main combustion chamber to the pre-combustion chamber.

The open position of the control valve obviates the need for a bypass valve since the open position of the control valve allows for a more nearly free flow of gases between the pre-combustion and combustion chambers. The closed position of the valve still functions as a control plate between the pre-combustion and combustion chambers to support a desired two-stage combustion process.

With the three valves (intake, control, and exhaust valves) linked together in series, a common actuator can be used for opening or closing all three valves. For example, a tie rod, supporting the closure members of the three valves can be biased with respect to the valve seats in the combustion chambers in a direction for opening the three valves, and a trigger can be mechanically connected to the linkage for moving the tie rod in another direction for closing the three valves. The trigger can also be connected to other components throughout a range of travel. For example, the trigger can engage an actuator for supplying a measured amount of pressurized fuel and air through the open intake valve into the pre-combustion chamber while the valves are all open, and the trigger can engage an igniter for igniting the fuel/air mixture in the pre-combustion chamber while the valves are all closed.

Alternatively, a solenoid, a fluid-power actuator, or other controllable power source, can be connected (directly or indirectly) to the tie between closure members for collectively opening or closing the intake, control, and exhaust valves. The solenoid, which can be separately powered by battery, can be electrically connected to the trigger for timing its operation. The fluid-powered actuator, which can be powered by combustion gases or fuel pressure, can be connected to fluid timing devices as well as the trigger for timing its operation. Automatic or manual operation of the gas-powered tool can be achieved.

Another version of the invention as a gas-powered tool motor features a combustion chamber including an intake valve at one end, an exhaust valve at another end, and a control valve between two portions of the combustion chamber. An intake manifold delivers a fuel and air mixture to the combustion chamber through the intake valve. A piston in communication with the combustion chamber displaces in response to expanding combustion gases from the combustion chamber. The intake, control, and exhaust valves all have closure members that are movable along a common axis in tandem between collective open positions for recharging the combustion chamber with the fuel and air mixture (as well as purging the combustion chambers of exhaust gases) and collective closed positions for detonating the fuel and air mixture in the combustion chamber and displacing the piston.

The closure members of the intake, control, and exhaust valves are preferably carried along a common tie that is translatable in opposite directions along the common axis for opening and closing the valves. Seats of the intake, control, and exhaust valves project from an interior wall of the combustion chamber. The closure members are collectively moved toward the seats for closing the valves and are collectively moved away from the seats for opening the valves.

The control valve preferably allows limited air flows from a first portion of the combustion chamber to a second portion of the combustion chamber in the closed position of the control valve. For example, the control valve can include one or more openings for supporting the limited air flows between the first and second portions of the combustion chamber. Alternatively, the control valve can include a check valve that permits limited air flows from the first portion of the combustion chamber to the second portion of the combustion chamber while blocking similar air flows from the second portion of the combustion chamber to the first portion of combustion chamber.

A common actuator preferably provides for moving the closure members of the intake, control, and exhaust valves along the common axis between collective open and closed positions. A biasing mechanism can be used to exert a biasing force for moving the closure members of the intake, control, and exhaust valves in a first direction along the common axis. The common actuator overcomes the biasing force for moving the closure members of the intake, control, and exhaust valves in a second direction along the common axis.

For purposes of thermal regulation, a fuel supply, which is preferably stored as a liquefied gas under pressure, can be placed in thermal communication with the combustion chamber. For example, both the fuel supply and the combustion chamber can be arranged within thermally conductive housings, and the two thermally conductive housings can be brought into contact so that the fuel supply functions as a heat sink for the combustion chamber. Under cold ambient conditions, heating the fuel can itself be advantageous.

BRIEF DESCRIPTION OF THE DRAWING FIGURES

FIG. 7 is a schematic cross-sectional layout of the solenoid-actuated gas-powered tool with the solenoid de-energized and the valve assembly spring-biased closed for detonating the fuel/air mixture within the combustion chamber and displacing a piston.

DETAILED DESCRIPTION OF THE INVENTION

Figure 1:
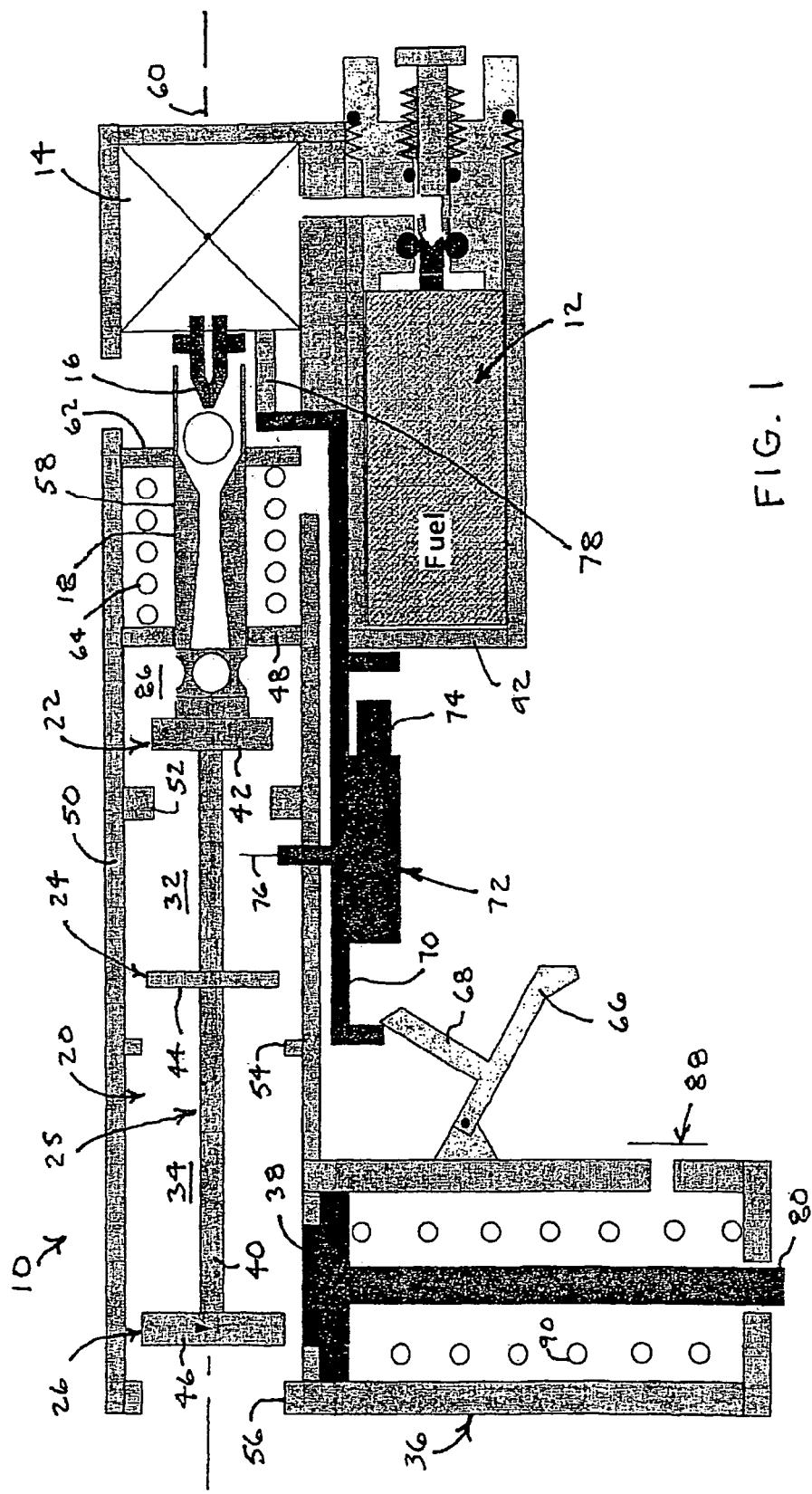
FIG. 1 is a schematic cross-sectional layout of a gas-powered tool in accordance with the invention in which intake, exhaust, and control valves are biased open.

A gas-powered tool motor 10, such as might be used for driving fasteners, appears within FIGS. 1-4 in various stages of operation. Beginning at a dormant state shown in FIG. 1, the tool motor 10 includes a regulated fuel supply 12 and a fuel injector 14 for injecting a metered amount of fuel through a nozzle 16 into an air-drafting jet pump 18 for delivering a mixture of fuel and air into a compound combustion chamber 20. The mixture of fuel and air enters the compound combustion chamber 20 through an intake valve 22 and spent exhaust gases exit the compound combustion chamber 20 through an exhaust valve 26. A control valve 24 divides the compound combustion chamber 20 into a pre-combustion chamber 32 and a main combustion chamber 34.

The compound combustion chamber 20 is preferably housed in the handle (not shown) of a tool. A cylinder 36 containing a displaceable power piston 38 is preferably oriented at a right angle or other orientation with respect to the compound combustion chamber 20 so as to be effective for performing useful work derived from the displacement of the piston 38. For example, a fastener such as a staple gun can be driven by a piston 38 oriented at a right angle to the handle-housed combustion chamber 20.

The intake valve 22 includes and intake closure member 42 and an intake seat 52, the control valve 24 includes a control closure member 44 and a control seat 54, and the exhaust valve 26 includes an exhaust closure member 46 and a closure seat 56. A tie rod 40 extending from the air-drafting jet pump 18 carries the intake closure member 42, the control closure member 44, and an exhaust closure member 46 along its length. The three seats 52, 54, and 56 project from interior walls of a housing 50 that extends through the combustion chamber 20. Together, the three valves can be referred to as a valve assembly 25.

A bearing mount 48 projects from the housing 50 into a sliding engagement with an outer surface 58 of the jet pump 18. A mounting flange 62 projects from the outer surface 58 of the jet pump 18 into a sliding engagement with the housing 50. Together, the bearing mount 48 and the mounting flange 62 support the jet pump 18 and tie rod 40 for translation along an axis 60 of the housing 50. Reciprocal translation of the tie rod 40 along the axis 60 moves the closure members 42, 44, and 46 into and out of relative engagement with the seats 52, 54, and 56 for closing and opening the intake valve 22, the control valve 24, and the exhaust valve 26. Although shown supported at just one end via the bearing mount 48 and mounting flange 62 of the jet pump 18, the valve assembly 25 can also be supported at its other end (i.e., closer to the exhaust closure member 46 or elsewhere along the length of the tie rod 40.

A compression spring 64 between the bearing mount 48 and the mounting flange 62 biases the tie rod 40, together with the three closure members 42, 44, and 46, into a position at which the intake, control, and exhaust valves 22, 24, and 26 are all open. A trigger 66, which is pivotally mounted from the piston cylinder 36, includes an arm 68 that engages a linkage 70 that is translatable for initiating various operating functions of the motor 10. For example, the linkage 70 in various positions engages an actuator 74 of an ignition system 72, an actuator 78 of the fuel injection system 14, and the mounting flange 62 the translatable jet pump 18 and tie rod 40.

Figure 2:
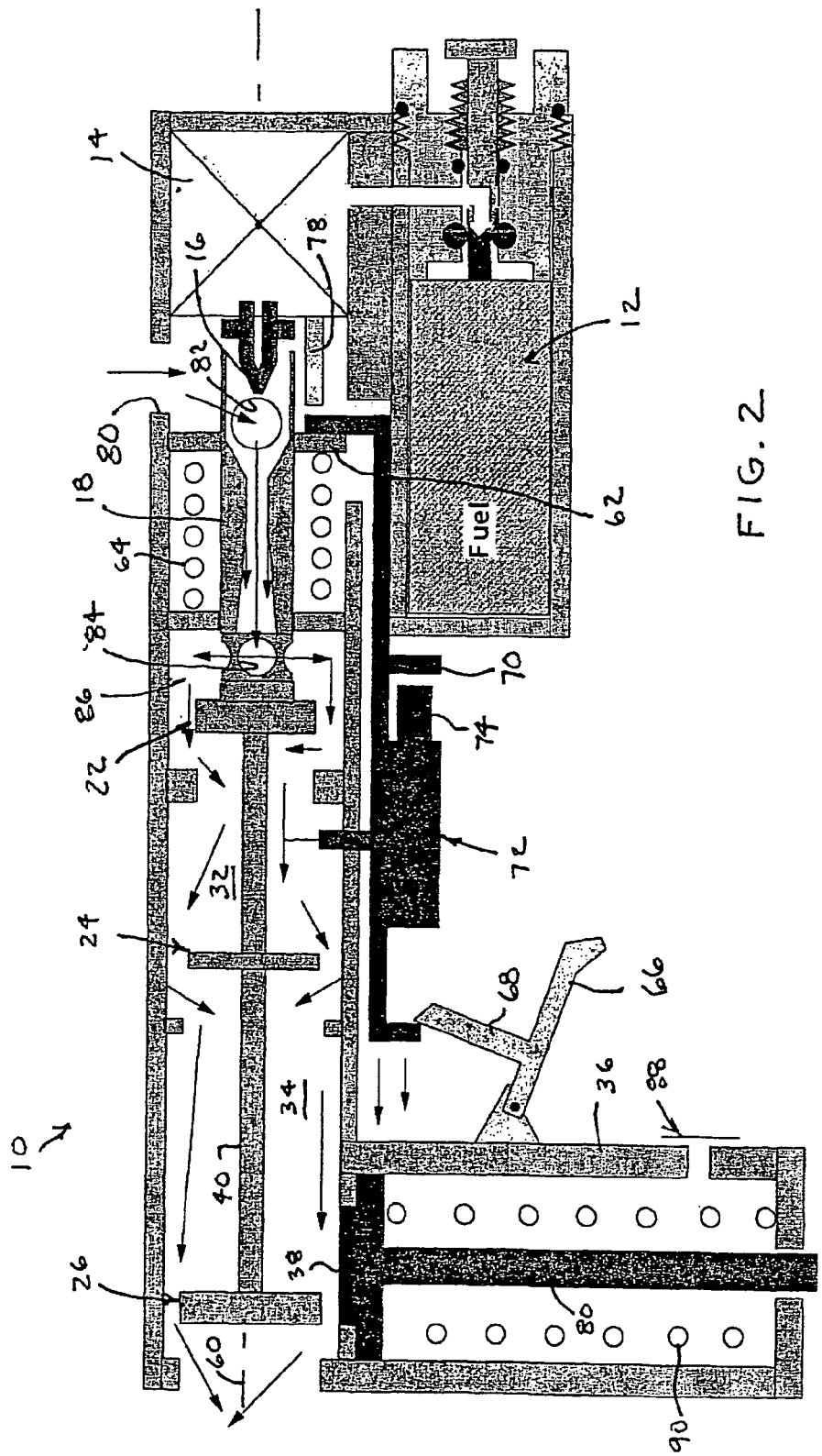
FIG. 2 is a schematic cross-sectional layout of the gas-powered tool with a trigger initially pulled for injecting a fuel/air mixture into the combustion chamber and for discharging exhaust gasses from the combustion chamber.

In the operating position of FIG. 2, the trigger 66 is pulled a short distance, which is enough for the linkage 70 to disengage from the actuator 78 of the fuel injection system 14 and release a metered amount of fuel under pressure through the nozzle 16 and into the jet pump 18. The fuel supply 12 is preferably a liquefied gas, such as propane or propylene, in a disposable or refillable container. Intake passageways 80 and 82 allow ambient air to mix with the fuel within the jet pump 18. Passageway 84 allows the mixture of fuel and air to exit the jet pump 18 into an intake manifold 86 within the housing 50. Although the linkage 70 may initially engage the mounting flange 62 of the jet pump 18, the intake, control, and exhaust valves 22, 24, and 26 remain open for circulating the fuel and air mixture through the combustion chamber 20. The fuel/air mixture enters the pre-combustion chamber 32 through the intake valve 22 and passes through the control valve 24 into the main combustion chamber 34. Flows of the fuel/air mixture into the combustion chamber 20 tend to push any remaining exhaust gases out of the combustion chamber 20 through the exhaust valve 26 in an operation referred to as scavenging.

Upon initially pulling of the trigger 66 of the tool motor 10, fuel is delivered at pressure through the fuel injector 14 to the jet pump 18. As shown in FIG. 2, the initial depression of the trigger 66 moves the linkage 70 forward causing the fuel injector actuator 78 to supply a metered amount of pressurized fuel to the jet nozzle 16. Movement of the pressurized fuel through the nozzle 16 draws ambient air through the jet pump 18 mixing with the fuel and causing the fuel/air mixture to both charge the combustion chamber 20 and displace any exhaust gases remaining in the combustion chamber 20 from a previous cycle out through the exhaust valve 26.

Figure 3:
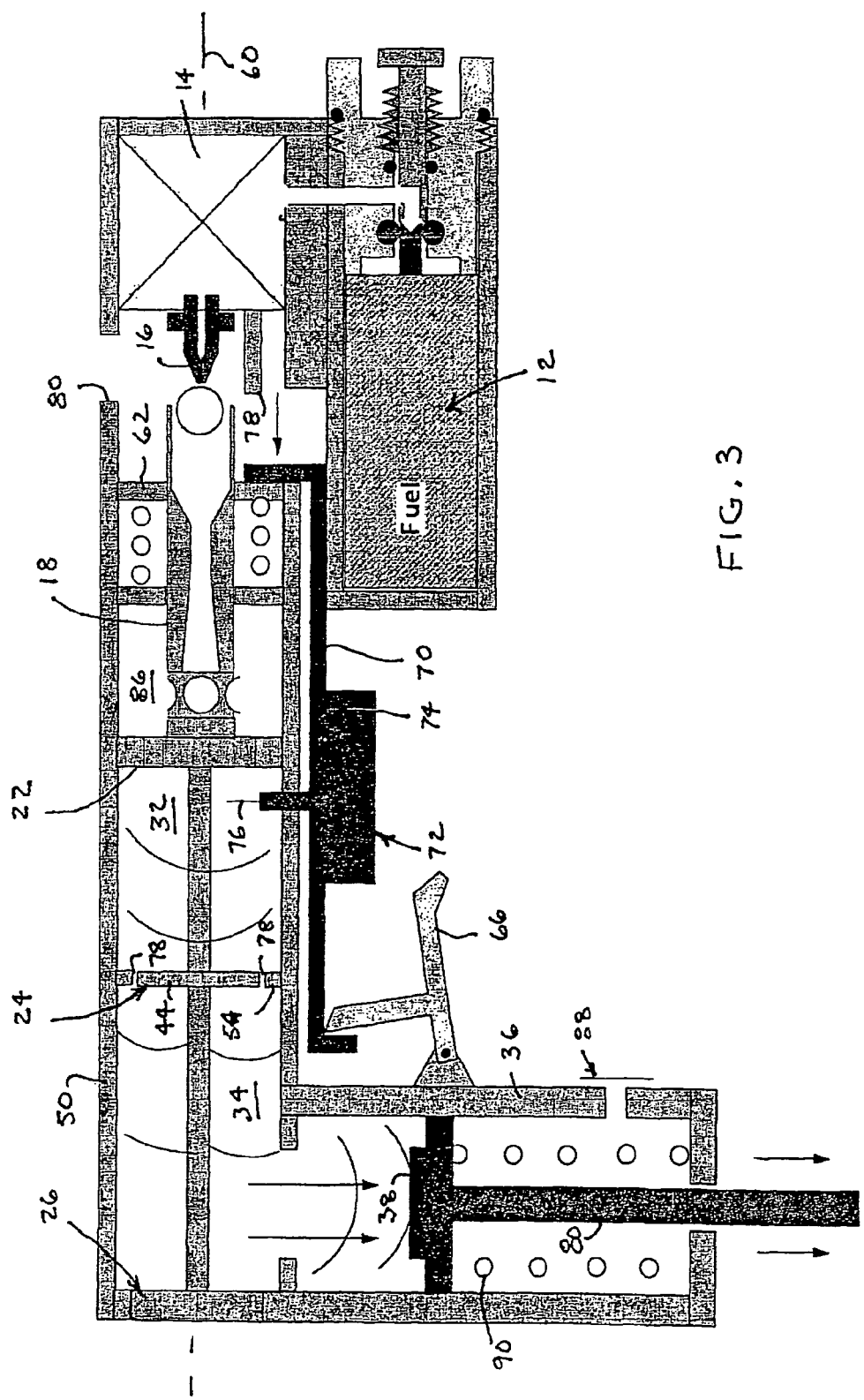
FIG. 3 is a schematic cross-sectional layout of the gas-powered tool with the trigger fully pulled for collectively closing the intake, exhaust, and control valves, detonating a fuel/air mixture within a combustion chamber, and displacing a piston.

More fully depressing the trigger 66, as shown in FIG. 3, moves the intake, control, and exhaust valves 22, 24, and 26 into closed positions, via the engagement of the linkage 70 with the mounting flange 62 of the jet pump 18 and tie rod 40. Additionally, the trigger 66 through the linkage 70 engages the actuator 74 of an ignition system 72 for igniting the fuel/air mixture in the pre-combustion chamber 32. The ignition system 72 can be electronic or piezoelectric based to provide a spark through an electrode 76 in the pre-combustion chamber 32. Combustion initiates in the pre-combustion chamber 32 but spreads through a gap 78 in the control valve 24 into the main combustion chamber 34. Preferably, a portion of the fuel/air mixture in the pre-combustion chamber 32 is pushed through the gap 78 in advance of a flame front for further mixing and compressing the fuel/air mixture in the main-combustion chamber 34 just prior to its detonation. Expanding combustion gases are largely confined between the control valve 24 and the exhaust valve 26, leaving only the piston 38 through which the expansion can be adequately expressed. As shown in FIG. 3, the piston 38 is driven downward together with a piston shaft 80 that extends from the piston cylinder 36 for accomplishing useful work.

The size of the gap 78 through the closed control valve 24 can be controlled to regulate combustion power. Generally, smaller gaps generate larger combustion power within the main combustion chamber 34, presumably because of the increased velocity at which the fuel/air mixture passes through the gap 78. However, the gap 78 can be made too small, which limits the volume of the fuel/air mixture that can pass through the gap in advance of a flame front or can block the flame front itself. Thus, combustion power can be regulated by adjusting the size of gap 78, either larger or smaller than an optimum size at which combustion power is maximized. Similar results can be achieved by replacing or augmenting the gap 78 with orifices through the closure member 44 or the seat 54. For example, the closure member 44 could be relatively sized for forming a seal with the seat 54 in the closed position of the control valve 24, while still providing for supporting limited flows from the pre-combustion chamber 32 to the main combustion chamber 34 through orifices formed elsewhere through the valve 24.

Figure 4:
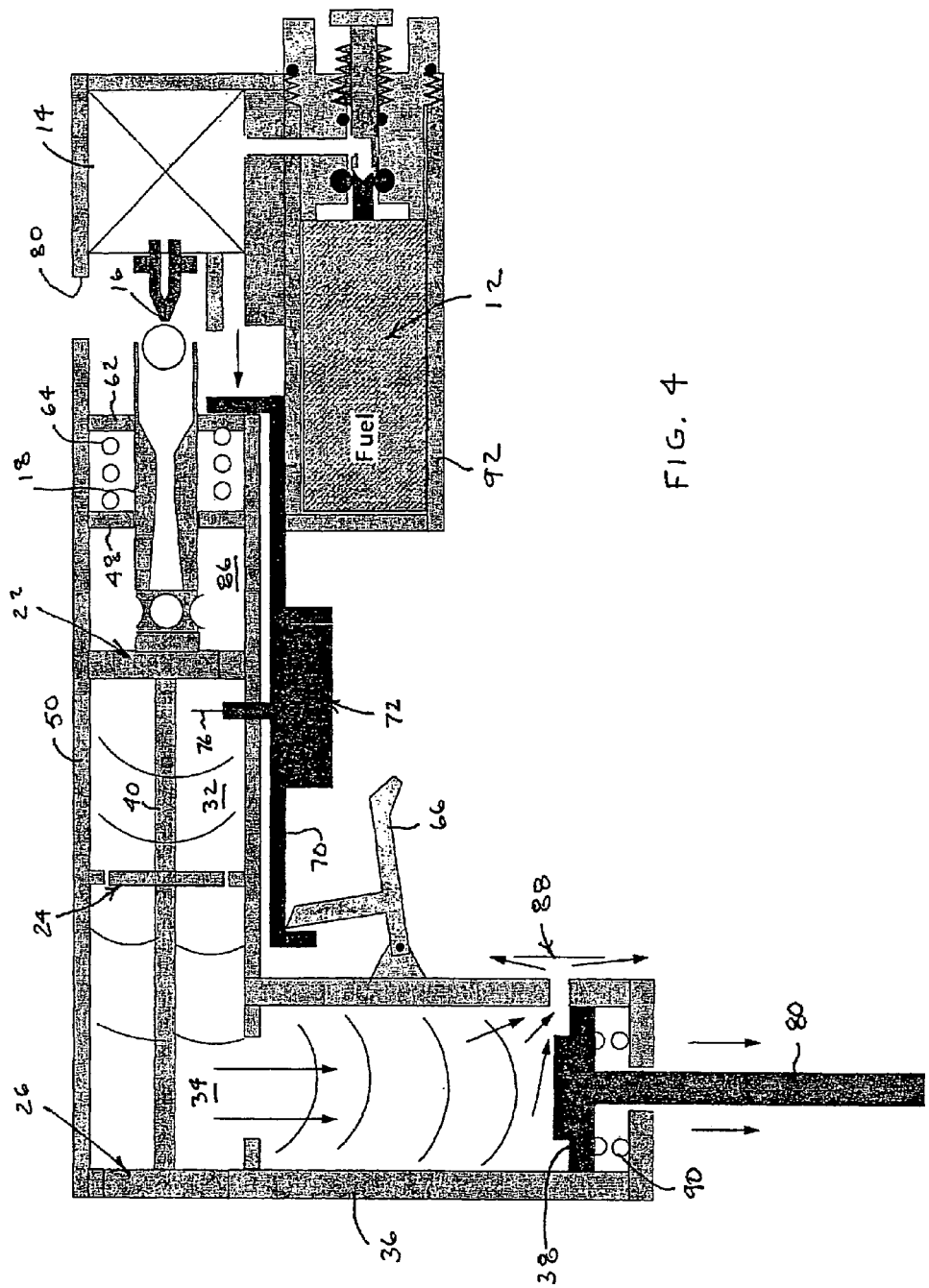
FIG. 4 is a schematic cross-sectional layout of the gas-powered tool showing the progress of detonation for further displacing the piston.

The operating position of FIG. 4 is similar to the operating position of FIG. 3 but after a short lapse of time for allowing the piston 38 to travel its full length stroke within the piston cylinder 36. At its bottom position, the piston 38 allows exhaust gases to be vented through an exhaust check valve 88. The venting of the exhaust gases, which reduces temperatures and pressures within the piston cylinder 36, together with a spring 90 or other resilient member, provides for the return of the piston 38 to its topmost position in readiness for another stroke. The spring 90 is expected to be sufficient for low-power applications, but known vacuum or air return systems may be needed for higher power or longer piston stroke applications. Other than perhaps an on/off switch for the fuel supply, no other user controls are required for operating the tool motor 10.

The housing 50, which is preferably made of a thermally conductive metal, preferably contains not only the combustion chamber 20 and intake manifold 86 but also the jet pump 18 and the fuel injector 14. The fuel supply 12 is also preferably contained within a thermally conductive metal housing 92. The two thermally conductive housings 50 and 92 are mounted in thermal contact with each other so that heat from the combustion chamber 20 is conducted to the fuel, which is generally stored in an endothermic condition. The combustion chamber 20 can benefit from a decrease in operating temperature, while the fuel supply 12 can benefit from an increase in temperature for supporting flows through the jet nozzle 16 of the fuel injector 14.

Figure 5:
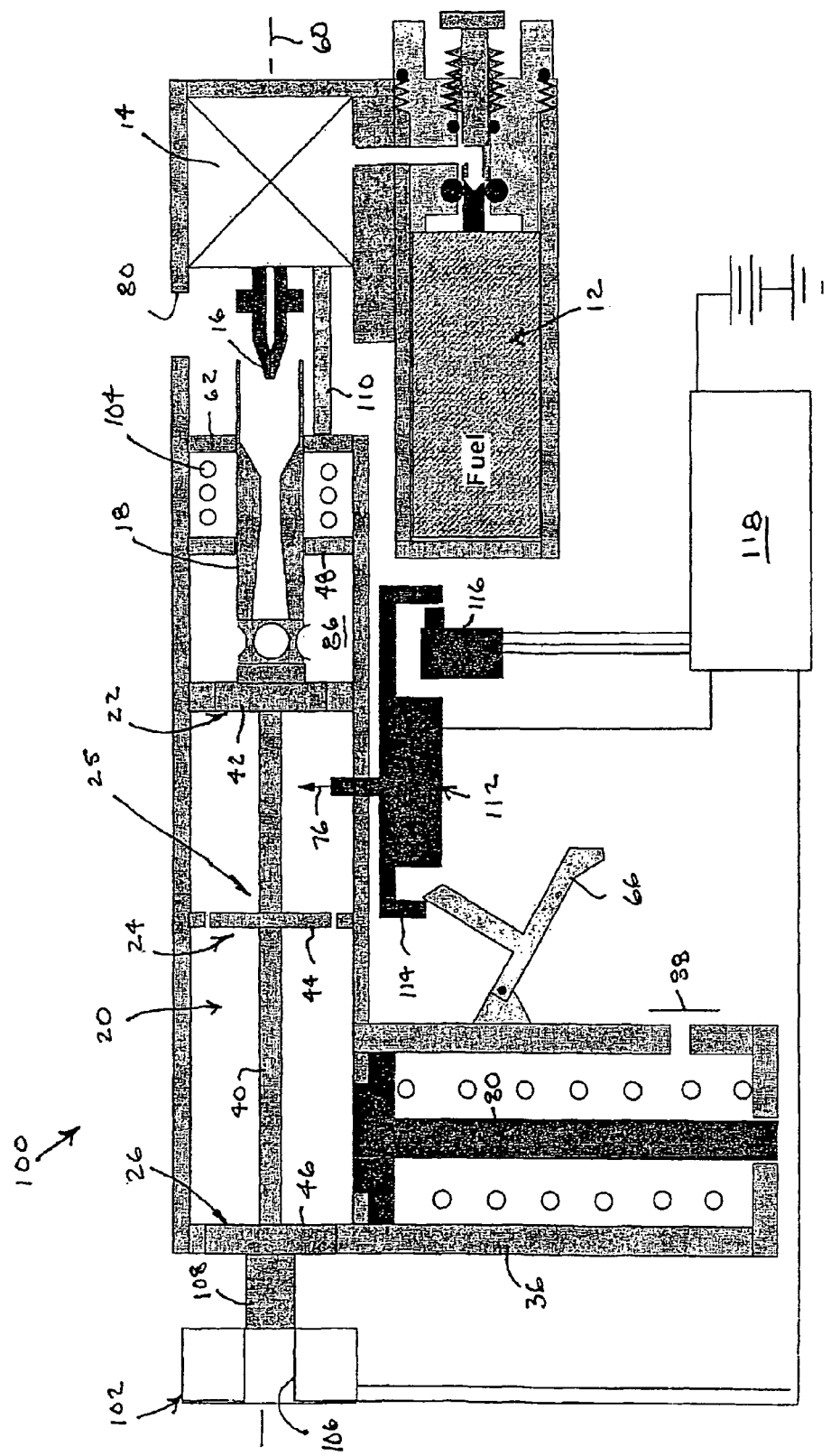
FIG. 5 is a schematic cross-sectional layout of an alternative gas-powered tool actuated by a solenoid for powering a positive displacement device oriented at a right angle to the stroke of the solenoid.
Figure 6:
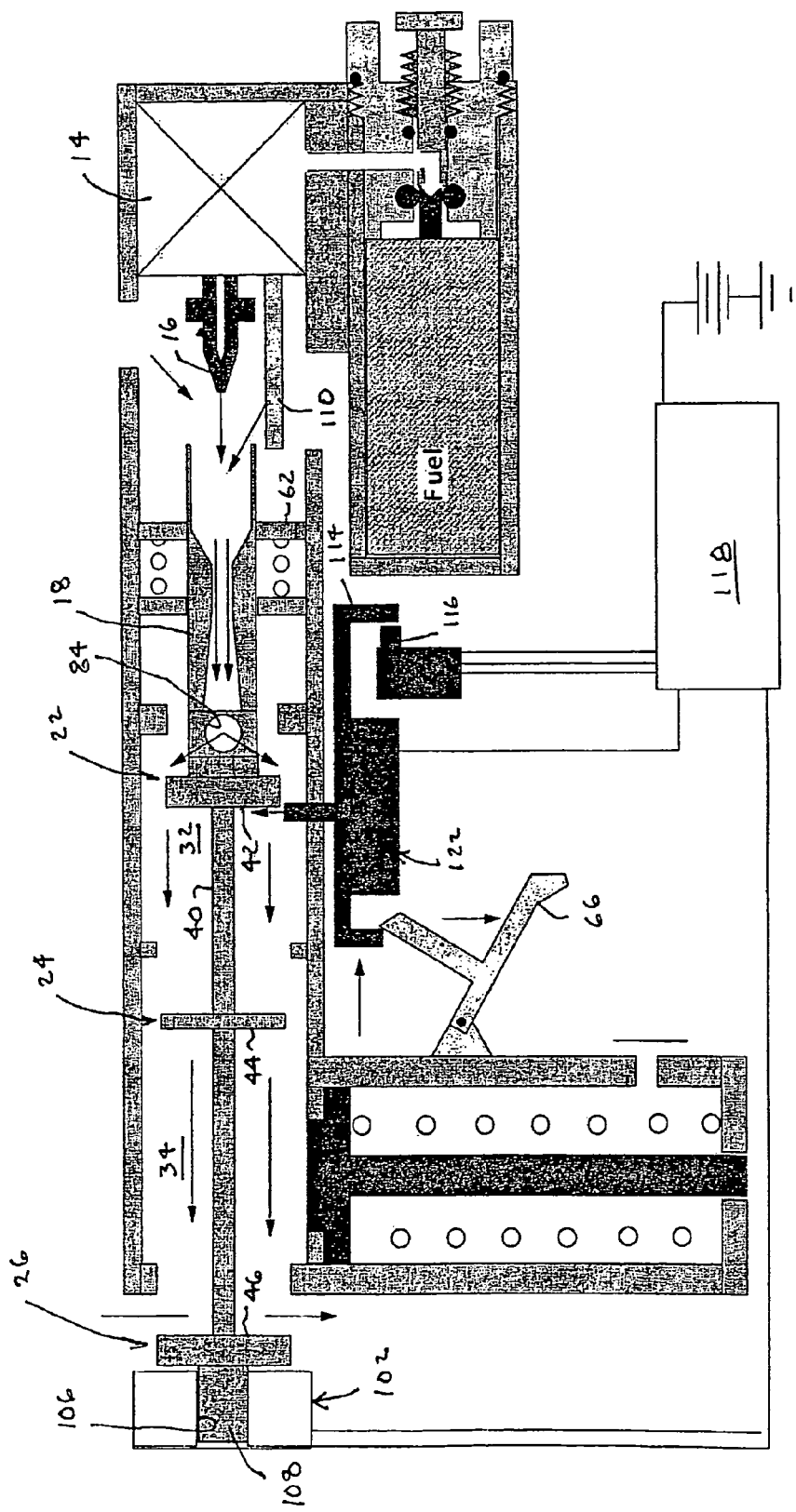
FIG. 6 is a schematic cross-sectional layout of the solenoid-actuated gas-powered tool with the solenoid energized for opening a valve assembly and recharging the combustion chamber with a fuel/air mixture and for discharging exhaust gasses from the combustion chamber.
Figure 7:
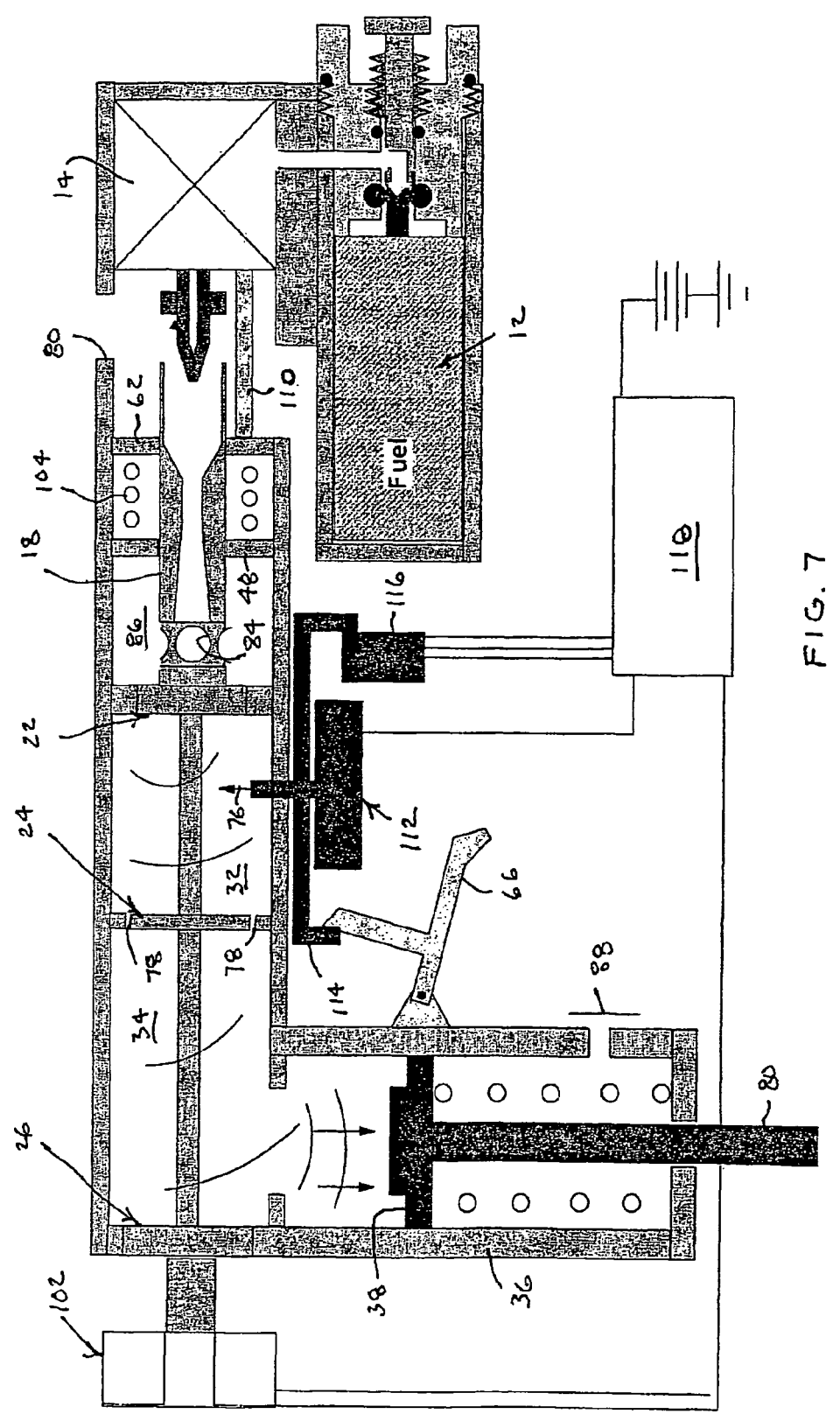

FIGS. 5-7 depict a modified gas-powered tool motor 100, which differs largely in the means for actuation. Structural features unchanged from the preceding embodiment retain the same identifying reference numerals. For instance, the fuel supply 12, the fuel injector 14, the jet pump 18, the intake manifold 86, the combustion chamber 20, and the right-angle-oriented piston cylinder 36 containing the displaceable piston 80 all remain much the same. Within the combustion chamber 20, the valve assembly 25 including the intake valve 22, the control valve 24, and the exhaust valve 26 remains structurally similar, although the mode of actuation differs.

Also similar to the preceding embodiment, the intake closure member 42, the control closure member 44, and the exhaust closure member 46 are carried on the tie rod 40 extending from the jet pump 18 for translation along their common axis 60. However, an electrically powered solenoid actuator 102 is provided for collectively translating the closure members 42, 44, and 46 along their common axis 60. Also in contrast to the preceding embodiment, the valves 22, 24, and 26 are opened and closed from opposite directions along the common axis 60, and a compression spring 104 between the between the bearing mount 48 and the mounting flange 62 is sized for biasing the valves 22, 24, and 26 into closed positions.

When energized, as shown in FIG. 6, the solenoid actuator 102, which includes an electromagnetic coil 106 and a plunger 108 extending from the tie rod 40, draws the plunger 108 and tie rod 40, together with the closure members 42, 44, and 46, toward the electromagnetic coil 106 for opening the intake, control, and exhaust valves 22, 24, and 26. Movement of the mounting flange 62 together with the jet pump 18 and tie rod 40 disengages the mounting flange 62 from an actuator 110 of the fuel injection system 14 and releases a metered amount of fuel under pressure through the nozzle 16 and into the jet pump 18. Output of the fuel and air mixture from the jet pump 18 recharges both portions 32 and 34 of the combustion chamber 20 and displaces any remaining exhaust gases through the exhaust valve 26.

When de-energized as shown in FIG. 7, the solenoid 102 allows the three valves 22, 24, and 26 to close via the biasing spring 104. A timed electronic controller 118 interconnects the trigger 66 with both the solenoid 102 and an ignition system 112 for initiating combustion within the pre-combustion chamber 32. An abbreviated linkage 114 connects the trigger 66 to timing switch 116 of the electronic controller 118, so that the depression of the trigger 66 provides for de-energizing the solenoid 102, thereby closing the three valves 22, 24, and 26, and for subsequently energizing an ignition coil of the ignition system 112, thereby generating a spark within the pre-combustion chamber 32. Similar to the preceding embodiment, the spark ignites the fuel/air mixture in the pre-combustion chamber 32 producing flame jets that are injected through the gap 78 in the closed control valve 24 into the main combustion chamber 34 and causing rapid combustion of the fuel/air mixture in the main combustion chamber 34. Pressures generated by the rapid combustion within the main combustion chamber displace the piston 38 within the piston cylinder 36 to provide power for useful work.

Although the spring 104 is arranged for biasing the three valves 22, 24, and 26 into a closed position and the solenoid actuator 102 is arranged for moving the valves 22, 24 and 26 into an open position, the spring 104 could be arranged for biasing the three valves 22, 24, and 26 into an open position and solenoid actuator 102 could be arranged for moving the valves 22, 24 and 26 into a closed position. The timed electronic controller 118 could be adapted so that ignition remains timed with the closed position of the valves 22, 24, and 26.

Figure 8:
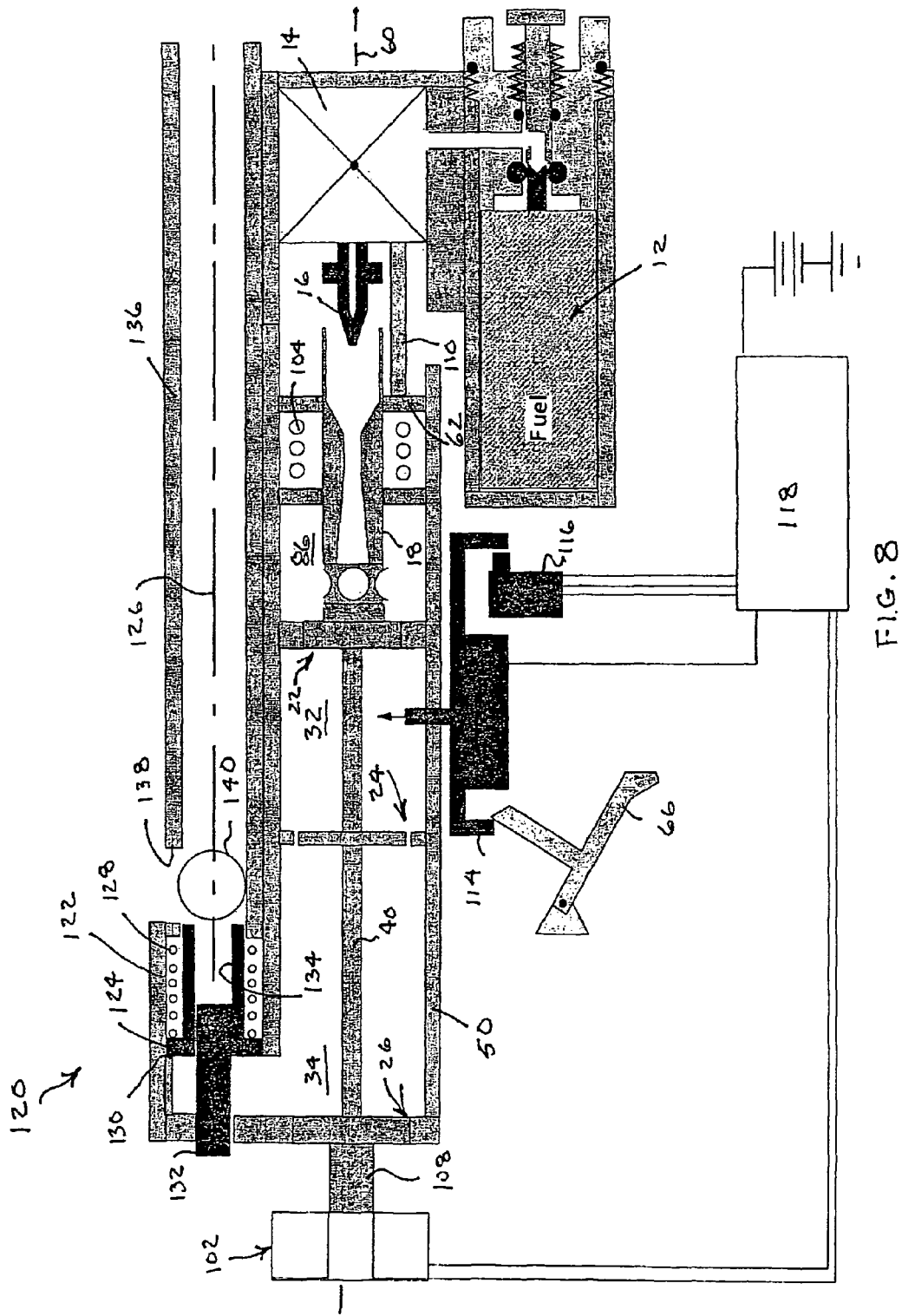
FIG. 8 is a schematic cross-sectional layout of a solenoid-actuated gas-powered tool for powering a positive displacement device oriented in parallel with the stroke of the solenoid.
Figure 9:
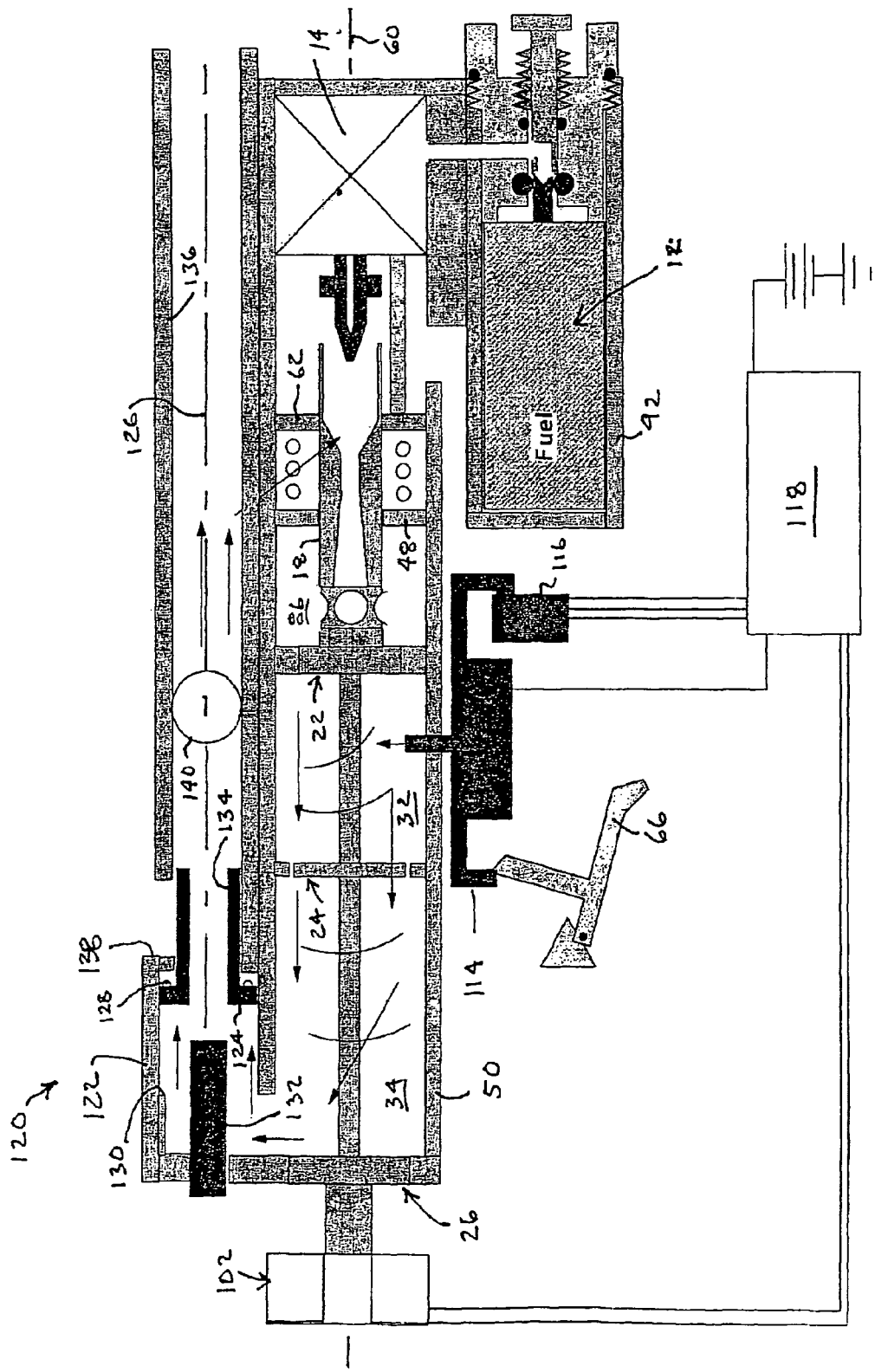
FIG. 9 is a schematic cross-sectional layout of the solenoid-actuated gas-powered tool with the positive displacement device oriented in parallel with the stroke of the solenoid in process of launching a projectile.
Figure 10:
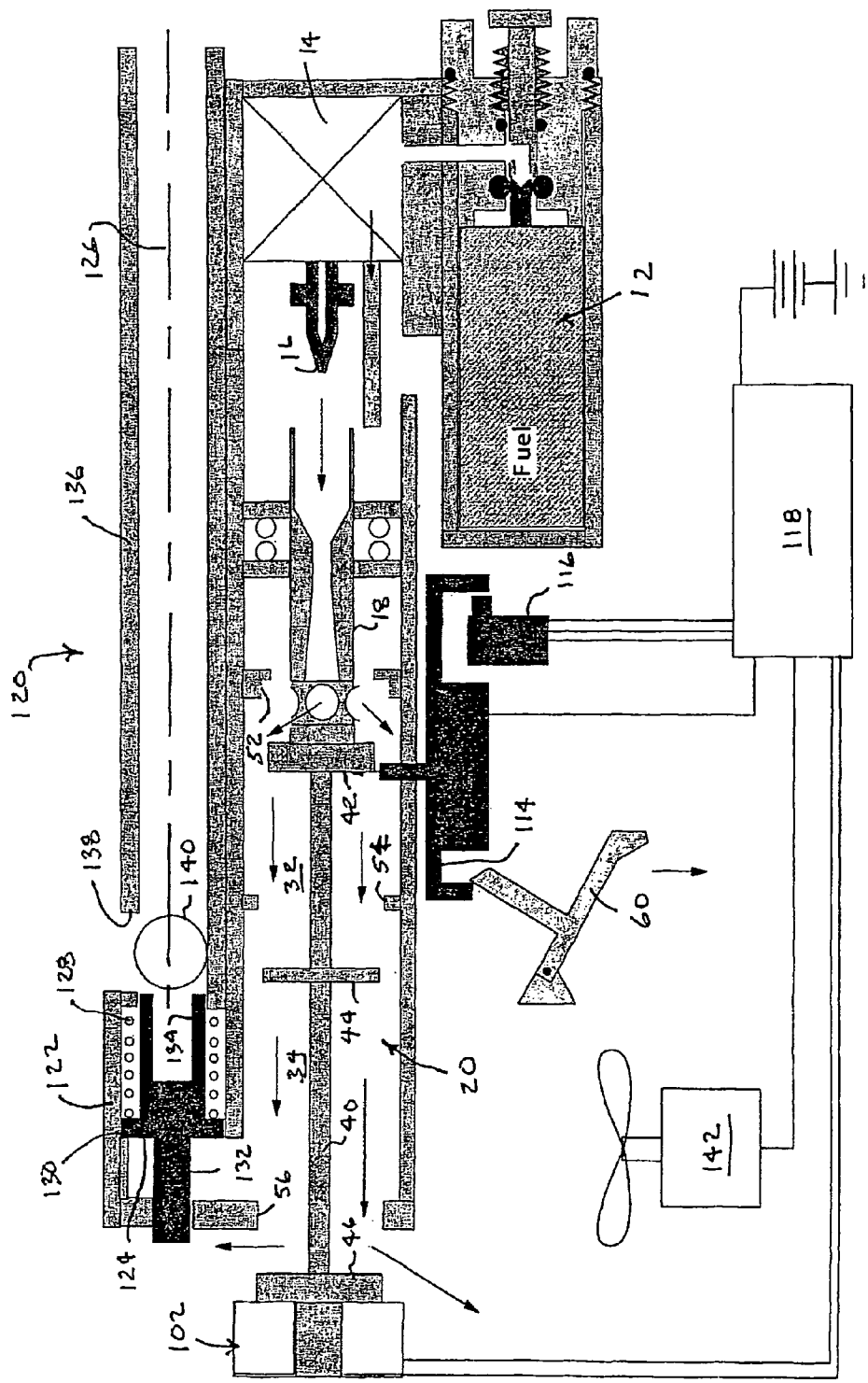
FIG. 10 is a schematic cross-sectional layout of the solenoid-actuated gas-powered tool of FIGS. 8 and 9 modified to include a cooling fan.
Figure 11:
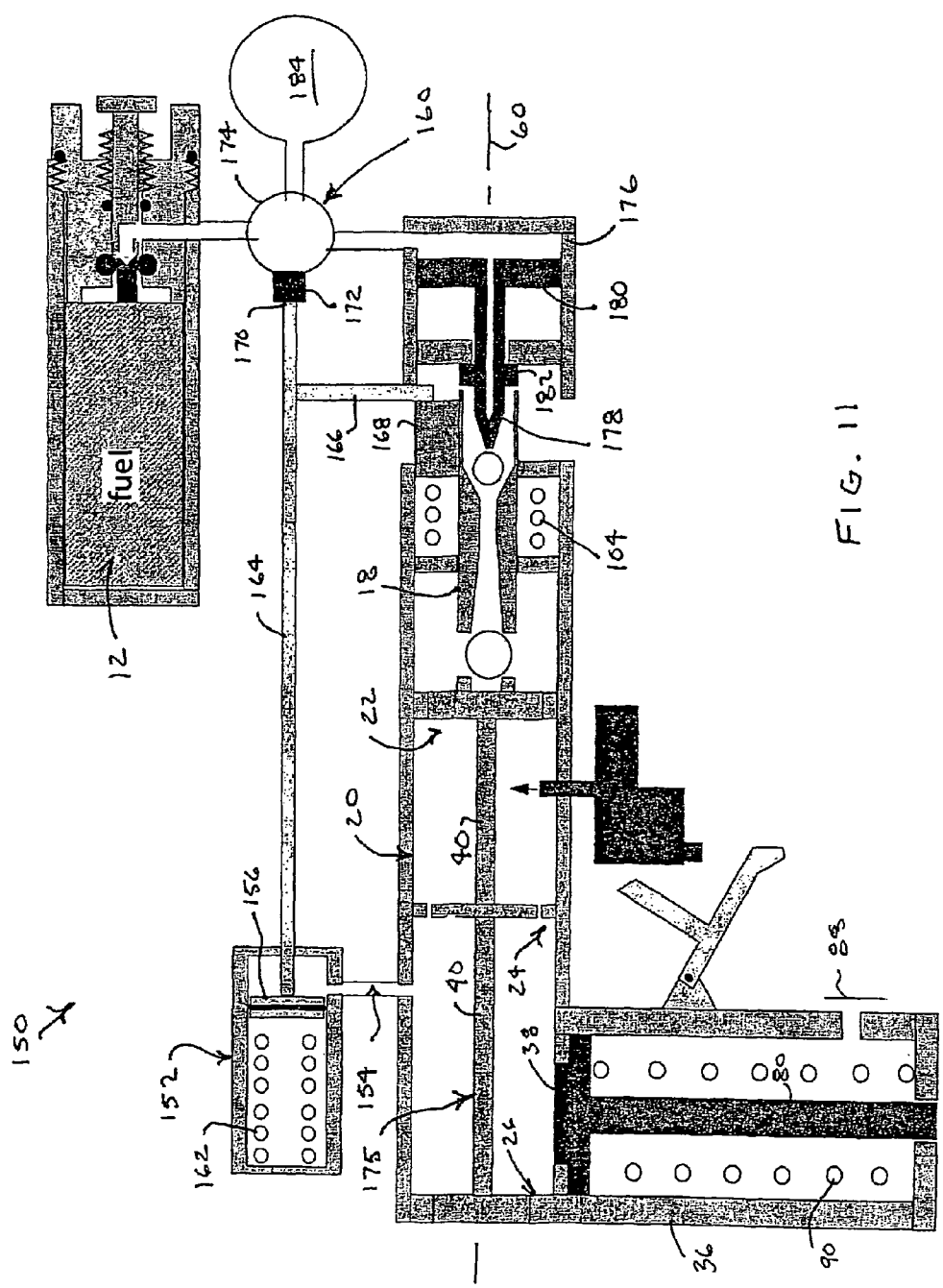
FIG. 11 is a schematic cross-sectional layout of a combustion actuated gas-powered tool.

FIGS. 8-10 present a modified tool motor 120 that is adapted for a different purpose—the launching of projectiles such as paintballs. The power-generating aspects of the tool motor 120 remain unchanged from the preceding embodiment, but power-expressing aspects have changed. In place of a right-angle oriented piston cylinder, a relatively smaller, parallel piston cylinder 122 is provided. A piston 124, which is displaceable along an axis 126 that extends parallel with the housing axis 60, is biased by a spring 128 against a stop 130 into an initial or topmost position. A speed adjusting pin 132 extends within a through bore 134 of the piston 124. A barrel 136 in open communication with the through bore 134 extends from the piston cylinder 122 along the axis 126. A loading port 138 allows projectiles (e.g., paintballs) 140 to be loaded through the barrel 136 into firing position just in advance of the piston cylinder 122.

The detonation of the tool motor 120 and the launching of projectile 140 are depicted by FIG. 9. Expanding combustion gases enter the piston cylinder 122 and drive the piston 124 into the barrel 136 closing loading port 138 and advancing the projectile 140 into the barrel 136. Displacement of the piston 122 beyond the speed adjusting pin 132 allows the expanding exhaust gases to enter the barrel 136 and to propel the projectile 140 through the barrel 136. The length or portion of the speed adjusting pin 136 within the piston bore 134 can be adjusted for adjusting the speed at which the projectile is launched.

A cooling fan 142 is shown in FIG. 10 as a further modification of the tool motor 120. The cooling fan 142 is connected to the electronic controller 118 for controlling its operation. For example, the cooling fan 142 could be thermostatically controlled to cool the tool 120, particularly the combustion chamber 20 of the tool 120 during tool operation.

FIGS. 11-14 depict a modified gas-powered tool motor 150 actuated by means of combustion gases to facilitate automatic operation of the motor 150. A fluid power actuator 152 in the form of an accumulator is plumbed to the combustion chamber 20 through a check valve orifice timer device 154 for receiving combustion pressure to activate a piston 156 that is mechanically linked to a spool valve assembly 175, comprising the intake, control, and exhaust valves 22, 24, and 26, and to a fuel portioning system 160 to provide the necessary cycling of the motor 150. The piston 156 is displaceable against a compression spring 162 in a first direction under pressure accumulated from the combustion chamber 20 and is displaceable in a second direction under the force accumulated by the compression spring 162.

A control rod 164 extending from the piston 156 includes a control arm 166 that engages a modified mounting flange 168 attached to the jet pump 18 and a control end 170 that engages a biased valve switch 172 of a fuel control valve 174 within the fuel portioning system 160. An injection nozzle 178 is attached to a fuel piston 180 forming a nozzle assembly that is displaceable within a modified housing 176 along the housing axis 60. A collar 182 surrounding the injection nozzle 178 engages the jet pump 18 so that displacement of the fuel piston 180 displaces not only the injection nozzle 178 but also the jet pump 18 and tie rod 40 for controlling operation of the spool valve assembly 175.

Figure 12:
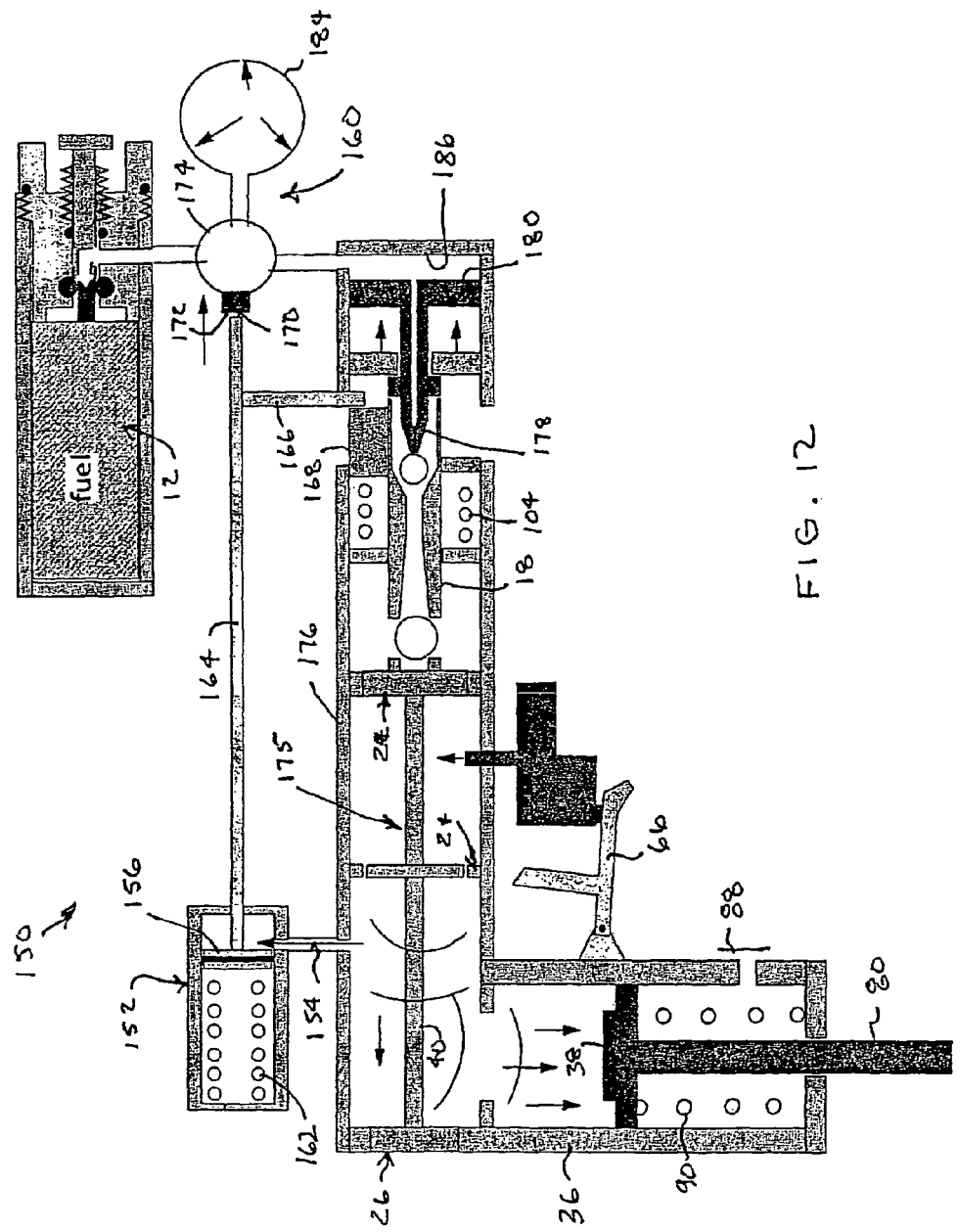
FIG. 12 is a schematic cross-sectional layout of the combustion actuated gas-powered tool undergoing combustion for displacing a piston.

As shown in FIG. 12, the fluid power actuator 152 is just starting to recharge with pressure from the combustion chamber. The spring 104 biases the spool valve assembly 175 into a closed position. The spring 162 biases the control end 170 of the control rod 164 into engagement with the biased valve switch 172 of the fuel control valve 174. The engagement of the biased valve switch 172 with the control end 170 opens a passageway between the fuel supply 12 and a fuel plenum 184 for filling the fuel plenum 184 with a desired quantity of pressurized fuel. The disengagement of the biased valve switch 172 with the control end 170 closes the passageway between the fuel supply 12 and the fuel plenum 184 and opens a passageway between the fuel plenum 184 and a fuel collection chamber 186 within the housing 176. The fuel piston 180 is displaced within the fuel collection chamber 186 to accommodate the influx of fuel from the plenum 184. The egress of fuel from the nozzle 178 eventually exhausts the fuel under pressure within the collection chamber 186.

Figure 13:
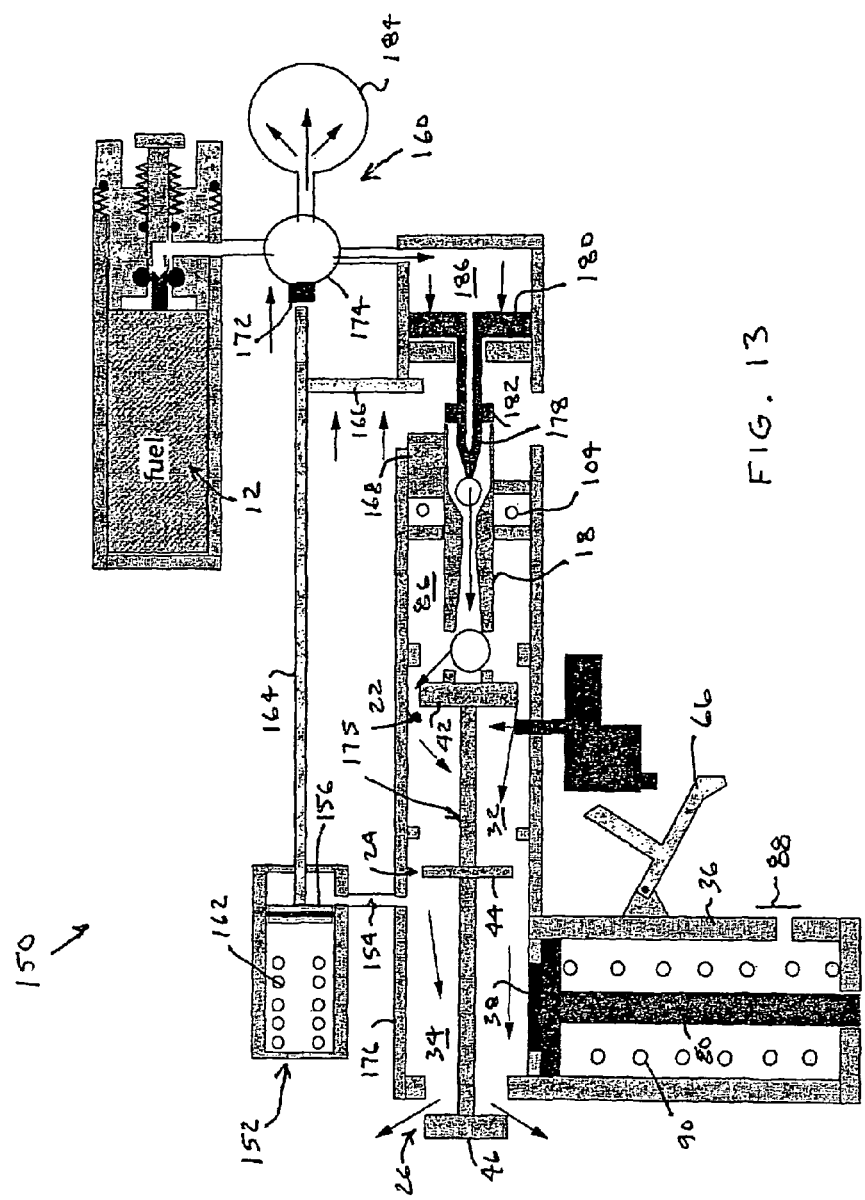
FIG. 13 is a schematic cross-sectional layout of the combustion actuated gas-powered tool with a spool valve opened for recharging the combustion chamber.
Figure 14:
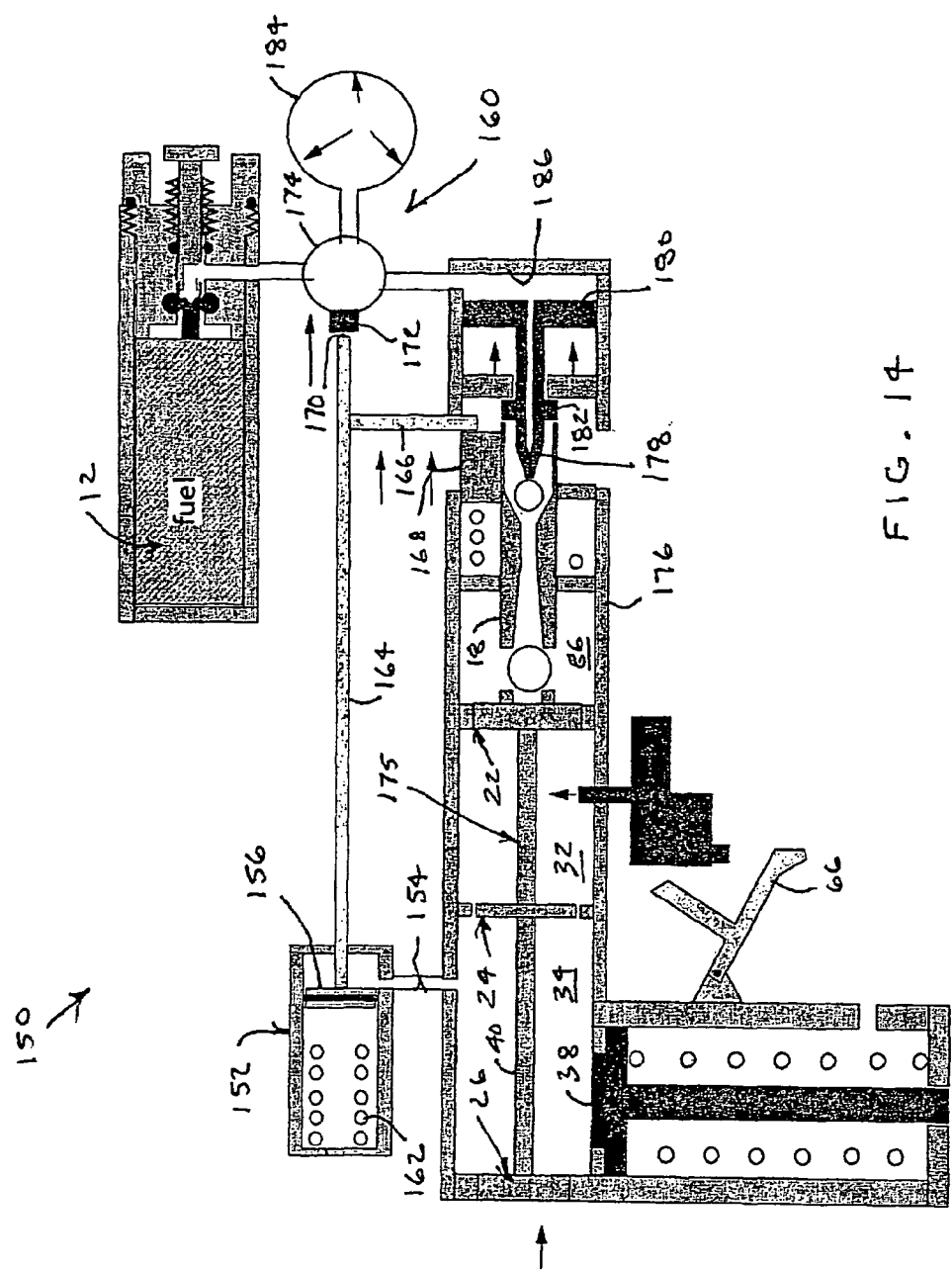
FIG. 14 is a schematic cross-sectional layout of the combustion actuated gas-powered tool with the spool valve closed in readiness for another cycle.

Similar to the preceding embodiments, the fuel propelled through the jet pump 18 entrains air, and the mixture is discharged into the intake manifold 86 while the spool valve assembly 175 is in an open position as shown in FIG. 13. The propelled mixture proceeds through the open intake and control valves 22 and 24 for recharging the pre-combustion and combustion chambers 32 and 34 while driving exhaust gases out the exhaust valve 26.

Pressure accumulating within the fluid power actuator 152 displaces piston 156 against the spring 162 for correspondingly displacing the control rod 164 and control arm 166 against the mounting flange 168, thereby moving the spool valve assembly 175 so as to open the intake, control, and exhaust valves 22, 24, and 26. The same movement of the control rod 164 in response to accumulating pressure within the actuator 152 disengages the control end 170 of the control rod 164 from a biased valve switch 172 for closing the passageway from the fuel supply 12 to the fuel plenum 184 and opening the passageway through a fuel control valve 174 from the fuel plenum 184 the fuel collection chamber 186.

Figure 15:
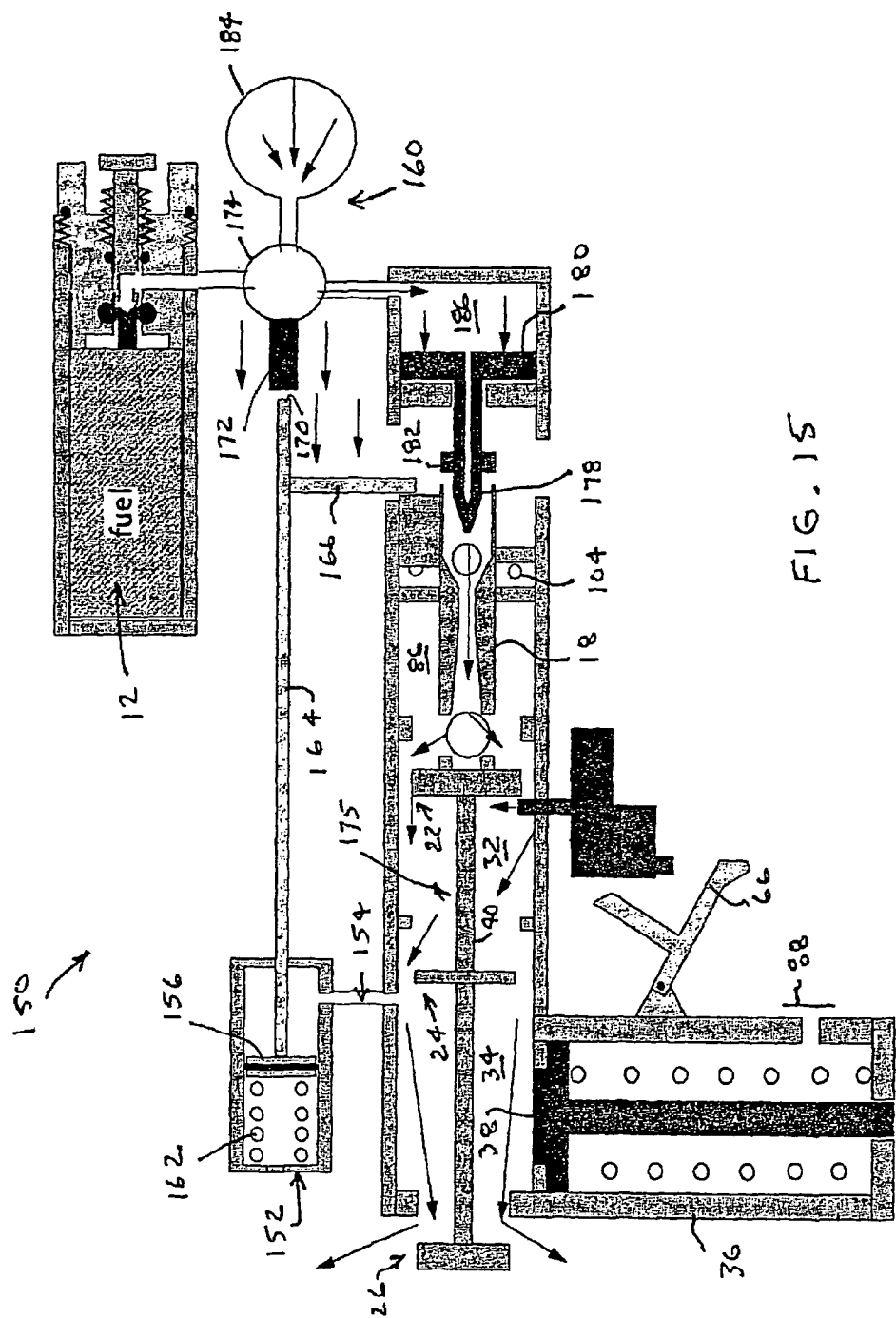
FIG. 15 is a schematic cross-sectional layout of the combustion actuated gas-powered tool under manual actuation for initiating a first firing cycle.
Figure 16:
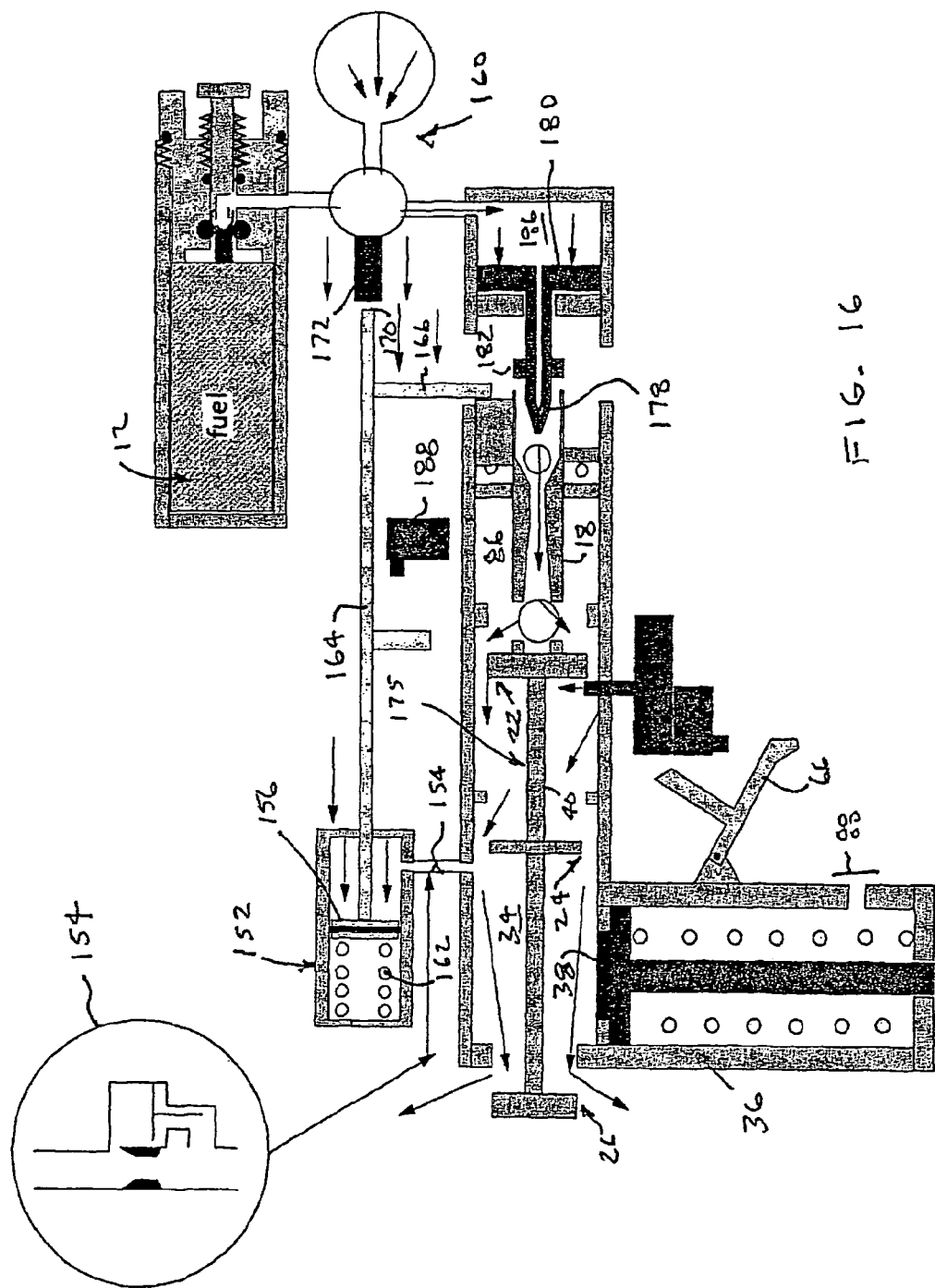
FIG. 16 is a schematic cross-sectional layout of the combustion actuated gas-powered tool with an automatic ignition.

FIG. 15 shows how the motor 150 can be manually started for a first cycle, and FIG. 16 shows how an alternate ignition switch 188 can be configured to provide automatic operation.

Figure 17:
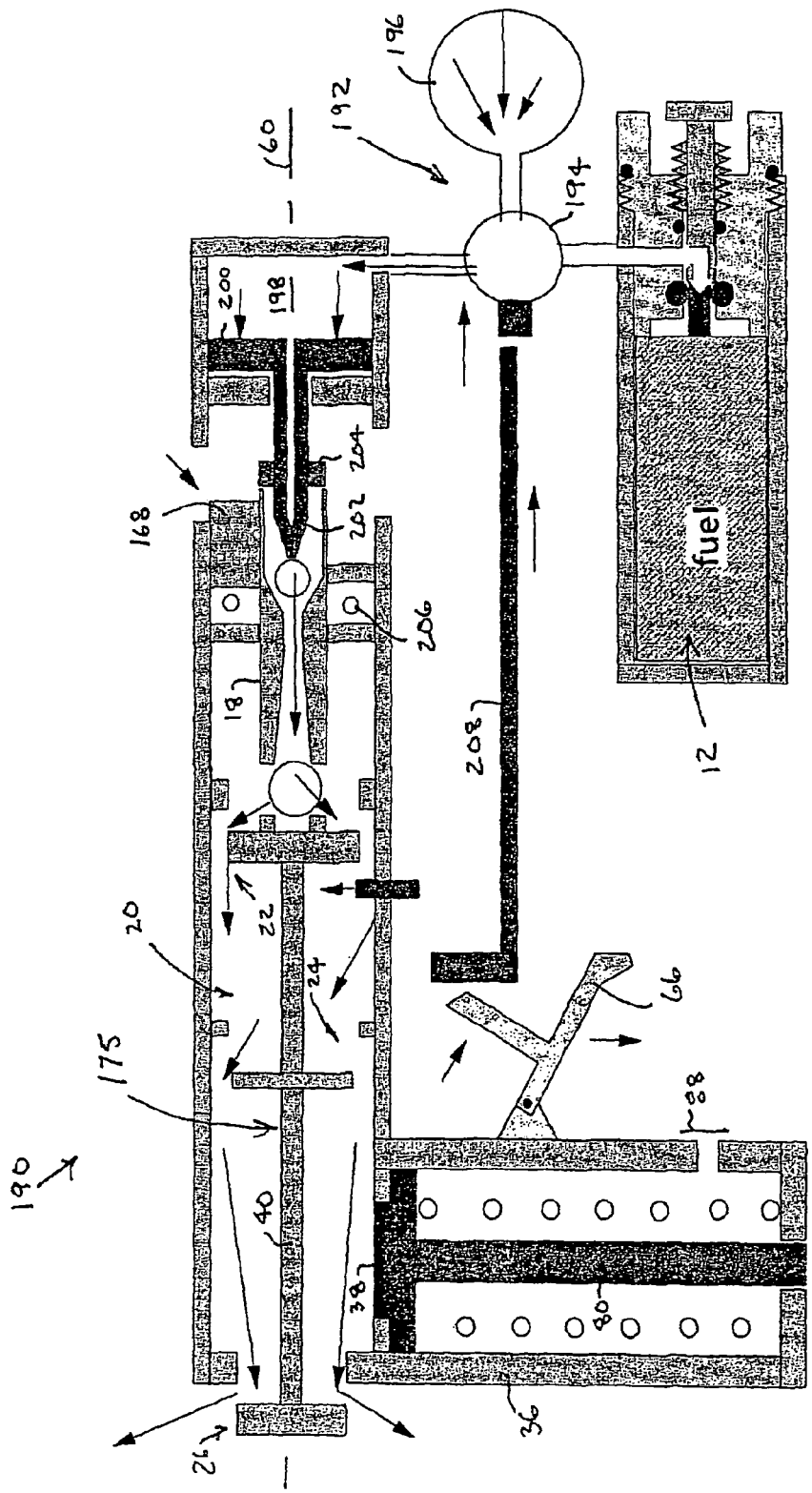
FIG. 17 is a schematic cross-sectional layout of a fuel-pressure actuated gas-powered tool.
Figure 18:
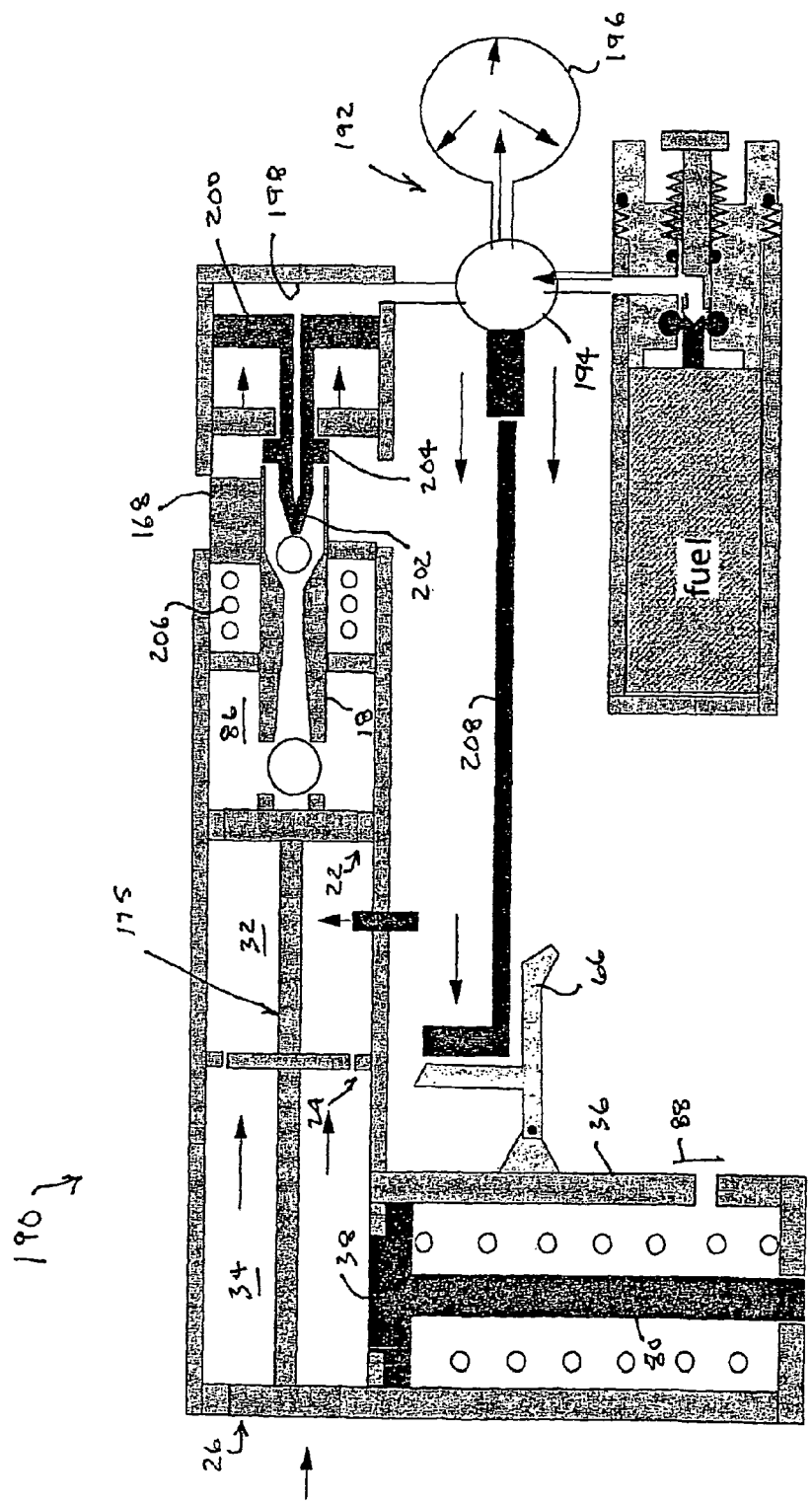
FIG. 18 is a schematic cross-sectional layout of the fuel-pressure actuated gas-powered tool with the spool valve closed in readiness for another cycle.

FIGS. 17 and 18 depict an alternative tool motor 190 showing how fuel pressure can be utilized to operate the spool valve assembly 175. In this embodiment, when the trigger 66 is pulled, as shown in FIG. 18, gaseous fuel under pressure, such as liquefied propylene, is transferred to a portioning system 192 from the fuel supply 12. When the trigger 66 is released, a linkage 208 toggles a fuel control valve 194 for closing a passageway from the fuel supply 12 and opening a passageway between a fuel plenum 196 and a fuel collection chamber 198. Similar to the preceding embodiment, a piston 200 or other positive displacement device is coupled to a fuel nozzle 202 forming a nozzle assembly. As shown in FIG. 17, pressure within the fuel collection chamber 198 displaces the piston 200 and fuel nozzle 202 (i.e., the nozzle assembly) along the housing axis 60. In addition, the displacement of the piston 200 operating through a collar 204 surrounding the nozzle 202 opens the spool valve system 175 enabling the pressurized fuel forced through the jet pump 18 to entrain air and establish a spark-ignitable fuel/air mixture within the combustion chamber 20 while expelling exhaust gases from the previous cycle. When the fuel in the fuel collection chamber 198 is depleted through the nozzle 202, a spring 206 returns the spool valve system 175 to its closed position. Alternately the sequence can be configured to operate and inject fuel when the trigger 66 is pulled as opposed to when it is released.

Figure 19:
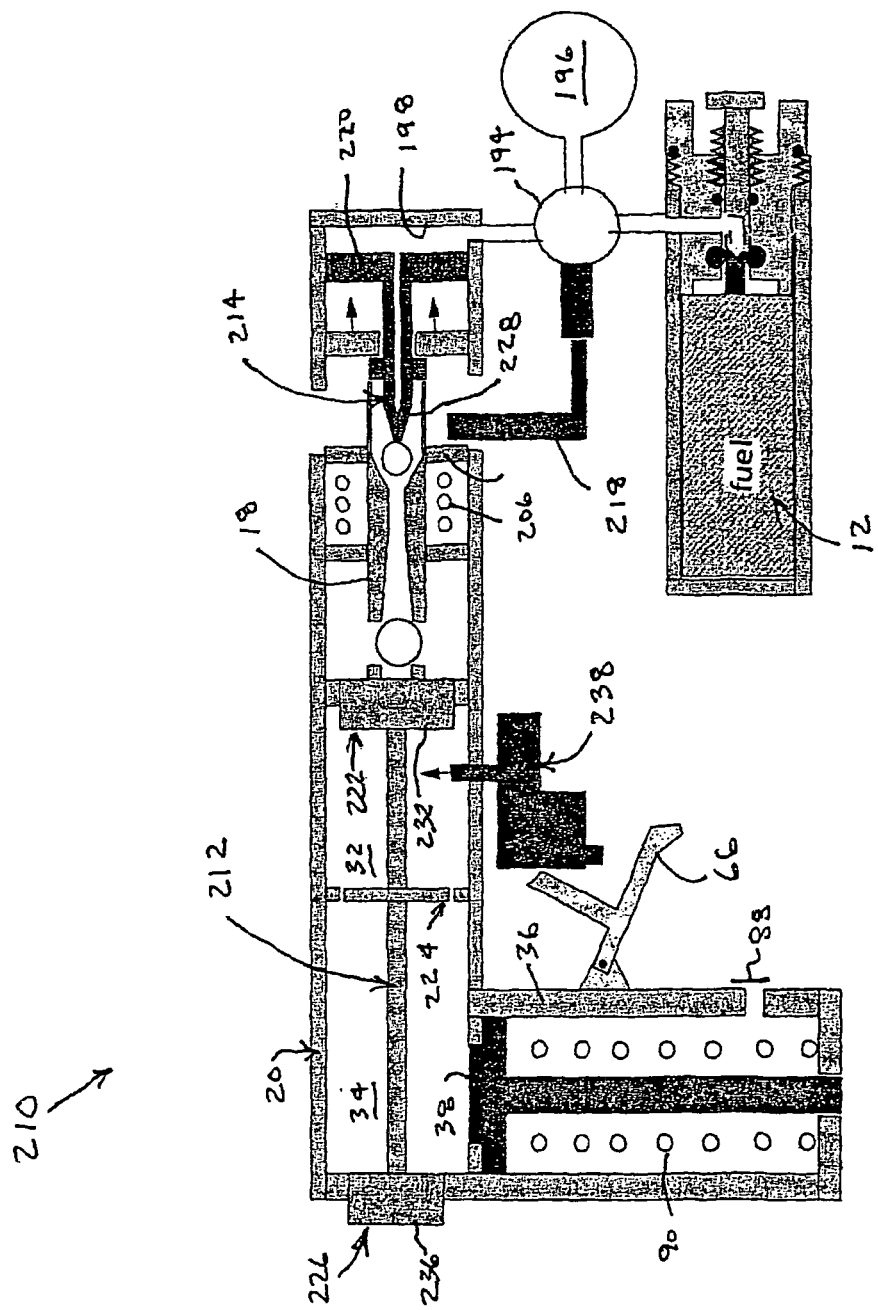
FIG. 19 is a schematic cross-sectional layout of a fuel-pressure actuated gas-powered tool with a control arm for automatic operation and showing the spool valve in a first (closed) position following recharging of the combustion chamber.
Figure 20:
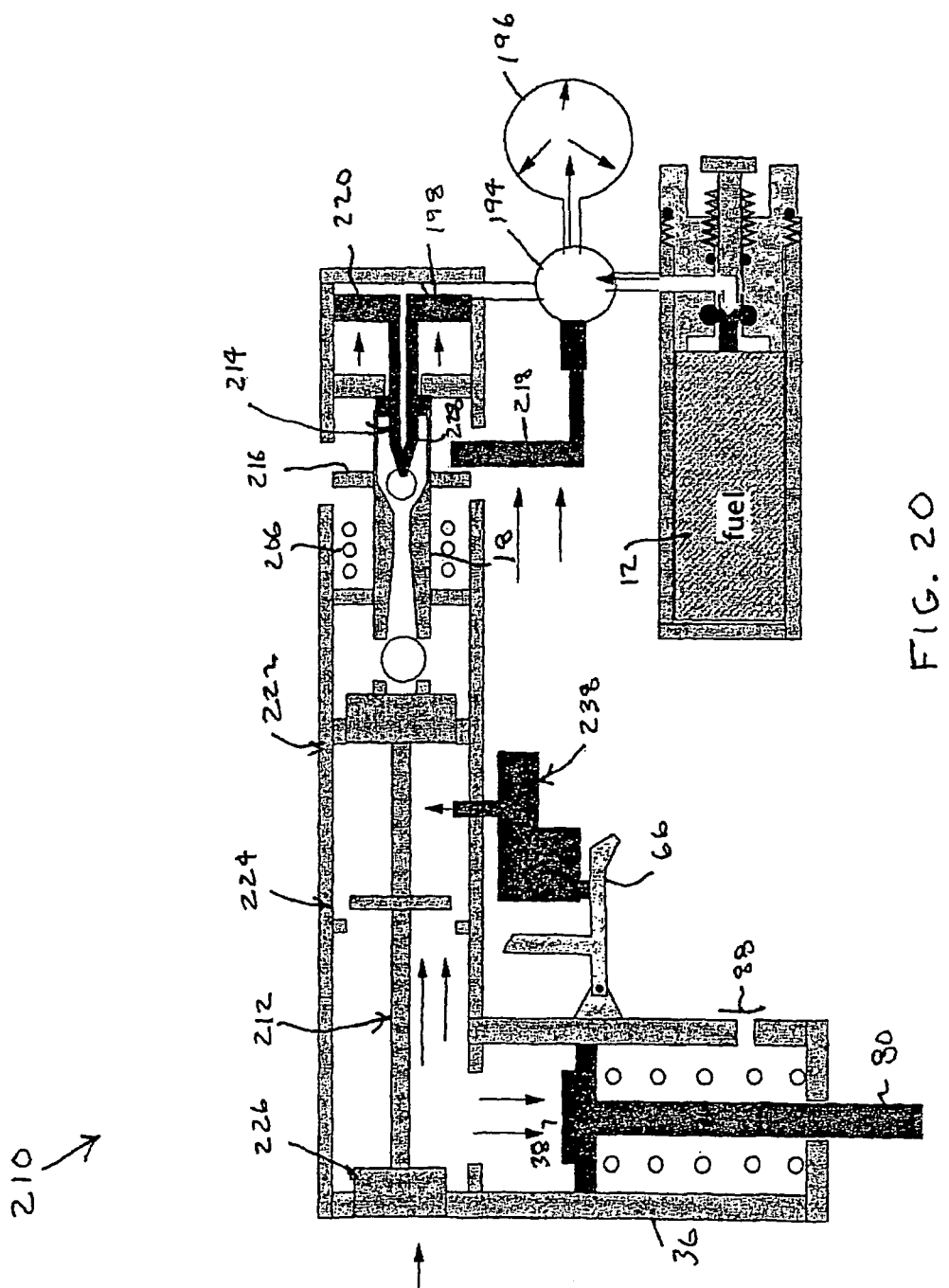
FIG. 20 is a schematic cross-sectional layout of the automatic fuel-pressure actuated gas-powered tool with the spool valve in a second (closed) position following detonation of the fuel/air mixture within the combustion chamber.
Figure 21:
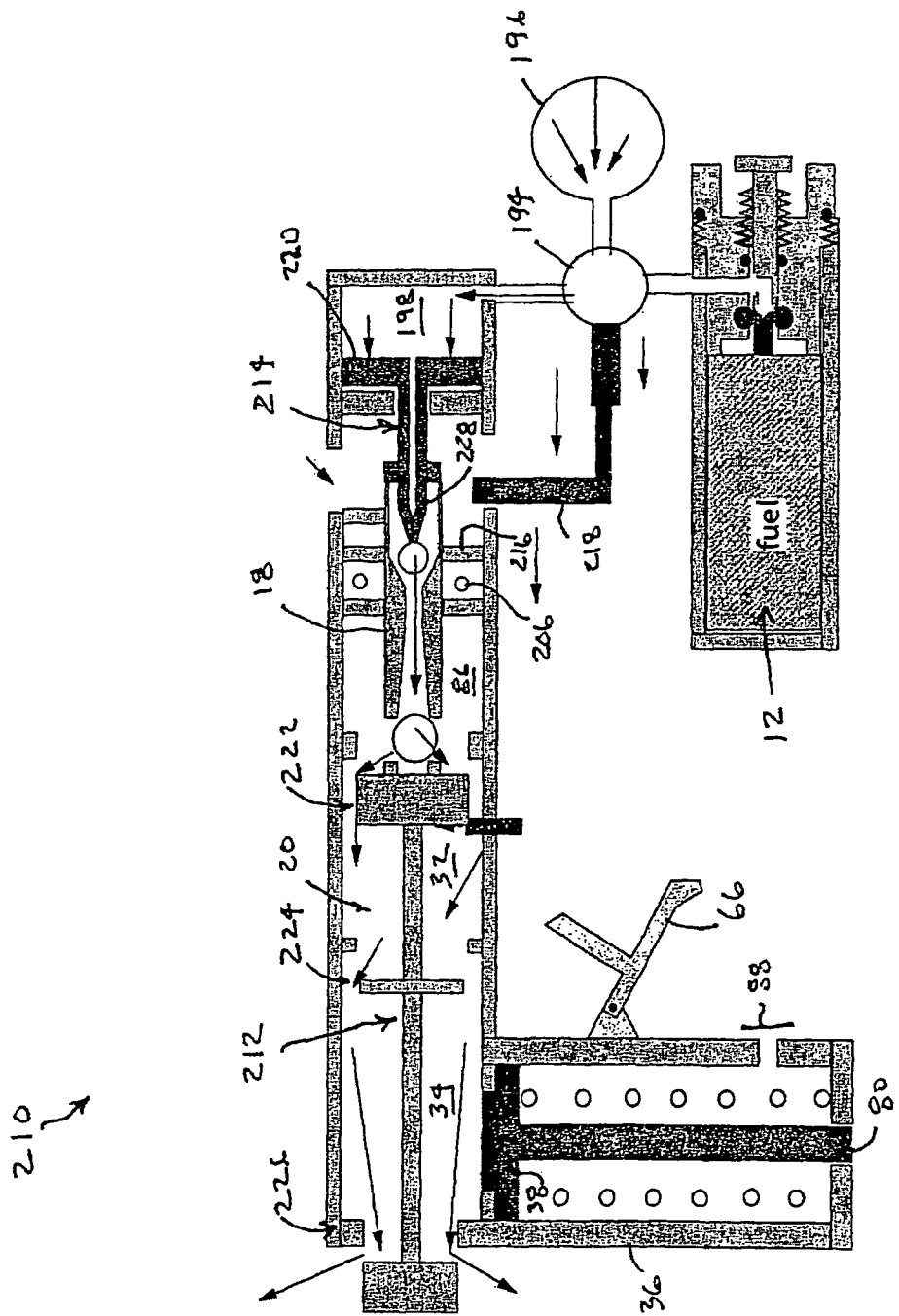
FIG. 21 is a schematic cross-sectional layout of the automatic fuel-pressure actuated gas-powered tool with the spool valve in a third (open) position accompanying the recharging of the combustion chamber.

FIGS. 19-21 show a further modified tool motor 210 whereby a spool valve assembly 212, including the intake, control, and exhaust valves 222, 224, and 226, and a nozzle assembly 214, including the piston 220 and fuel nozzle 228, operate in a 3-position sequence. An intake valve closure member 232 is sized larger than an exhaust valve closure member 236.

FIG. 19 depicts a first position in which the spool valve 212 is closed and the piston 220 of the nozzle assembly 214 is retracted under the bias of spring 206 following the depletion of fuel within the fuel collection chamber 198 and the recharging of the fuel/air mixture within the combustion chamber 20. FIG. 20 depicts a second position following the depression of the trigger 66 and ignition of the fuel/air mixture within the combustion chamber 20. The differential areas of the intake and exhaust valve closure members 232 and 236 exposed to combustion pressure drive the spool valve assembly 212 and the nozzle assembly 214 to the second position. A mounting flange 216 of the jet pump 18 engages a control arm 218 of the fuel control valve 194 for opening a passageway between the fuel supply 12 and the fuel plenum chamber 196.

When the combustion pressure subsides in the combustion chamber return spring 206 restores the spool valve assembly 212 to the first position. Corresponding movement of the control arm 218 of the fuel control valve 194 closes the passageway between the fuel supply 12 and the fuel plenum chamber 196 and opens the passageway between the fuel plenum chamber 196 and the fuel collection chamber 198. As shown in FIG. 21, the accumulation of fuel within the fuel collection chamber 198 displaces the nozzle assembly 214 together with the spool valve assembly 212 to a third position for recharging and purging the combustion chamber 20. Once the fuel pressure of the fuel plenum 196 has been exhausted, the spool and nozzle assemblies 212 and 214 return to the first position awaiting only an electrical spark from the ignition system 238 to repeat the cycle.

Figure 22:
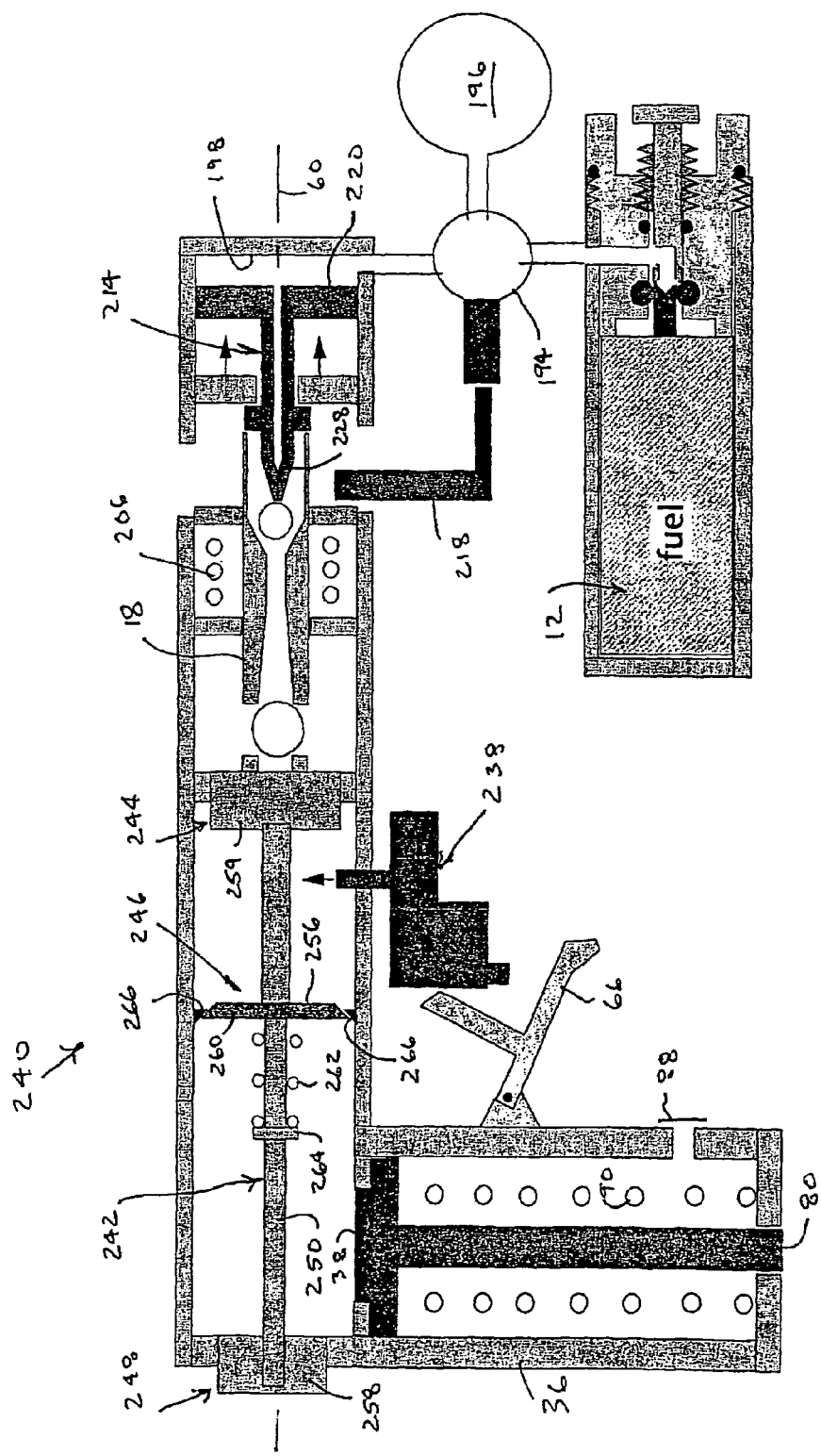
FIG. 22 is a schematic cross-sectional layout of an automatic fuel-pressure actuated gas-powered tool showing closed control valve as a poppet valve biased against its seat.
Figure 23:
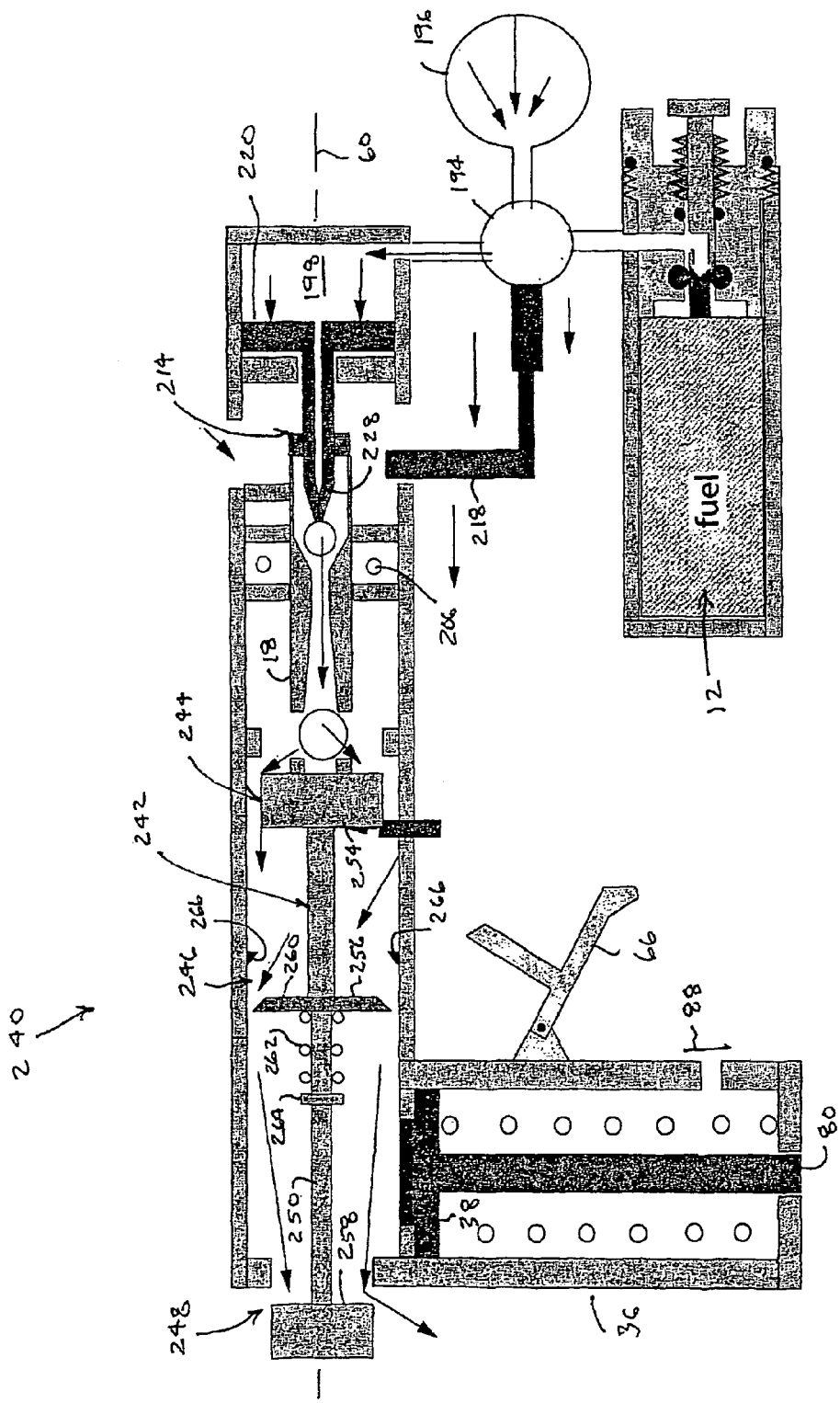
FIG. 23 is a schematic cross-sectional layout of the automatic fuel-pressure actuated gas-powered tool showing the control valve in an open position with the poppet valve displaced from its seat.

A gas-powered tool motor 240 as shown in FIGS. 22 and 23 includes a modified spool valve assembly 242. Intake and exhaust valves 244 and 248 are similar to the intake and exhaust valves of the spool valve assembly 212, but a control valve 246 is substantially changed. A control closure member 256 is carried on a tie rod 250 connecting intake and exhaust closure members 254 and 258. The control closure member 256 includes a spring-loaded poppet 260 that displaceable along the tie rod 250 against the biasing force of a spring 262 that is anchored to the tie rod 250 by a collar 264.

In the closed position of the spool valve assembly 242 shown in FIG. 22, the spring-loaded poppet 260 is biased into engagement with a mating control valve seat 266. Initial combustion pressures within the pre-combustion chamber 32 overcome the spring bias and displace the spring-loaded poppet 260 off of its control valve seat 266 to allow flow of the fuel/air mixture into the main combustion chamber 34 in advance of a flame front for igniting the compressed fuel/air mixture in the main combustion chamber 34. However, combustion within the main combustion chamber 34 closes the spring-loaded poppet 260 against its control valve seat 266 for blocking any loss of combustion pressure through the control valve 246. Thus, in its closed position, the control valve 246 functions as a check valve that permits limited flows from the pre-combustion chamber 32 to the main combustion chamber 34 but blocks return flows from the main combustion chamber 34 to the pre-combustion chamber 32.

FIG. 23 depicts the open position of the spool valve assembly 242 showing the displacement of the control closure member 256 together with the intake and exhaust closure members 254 and 258 along the common axis 60. That is, spring-loaded poppet 260 together with its biasing spring 262 and anchoring collar 264 are all moved together with the tie rod 250 to open the control valve 246 and allow the free flow of gases between the pre-combustion chamber 32 and main combustion chamber 34 for purposes of recharging and purging the combustion chamber.

Although the intake and exhaust closure members 254 and 258 are depicted at different sizes, the same or different size closure members can be used. A second collar (not shown) can be provided to limit travel of the spring-loaded poppet 260 along the tie rod 250 in the direction of the biasing force.

Figure 24:
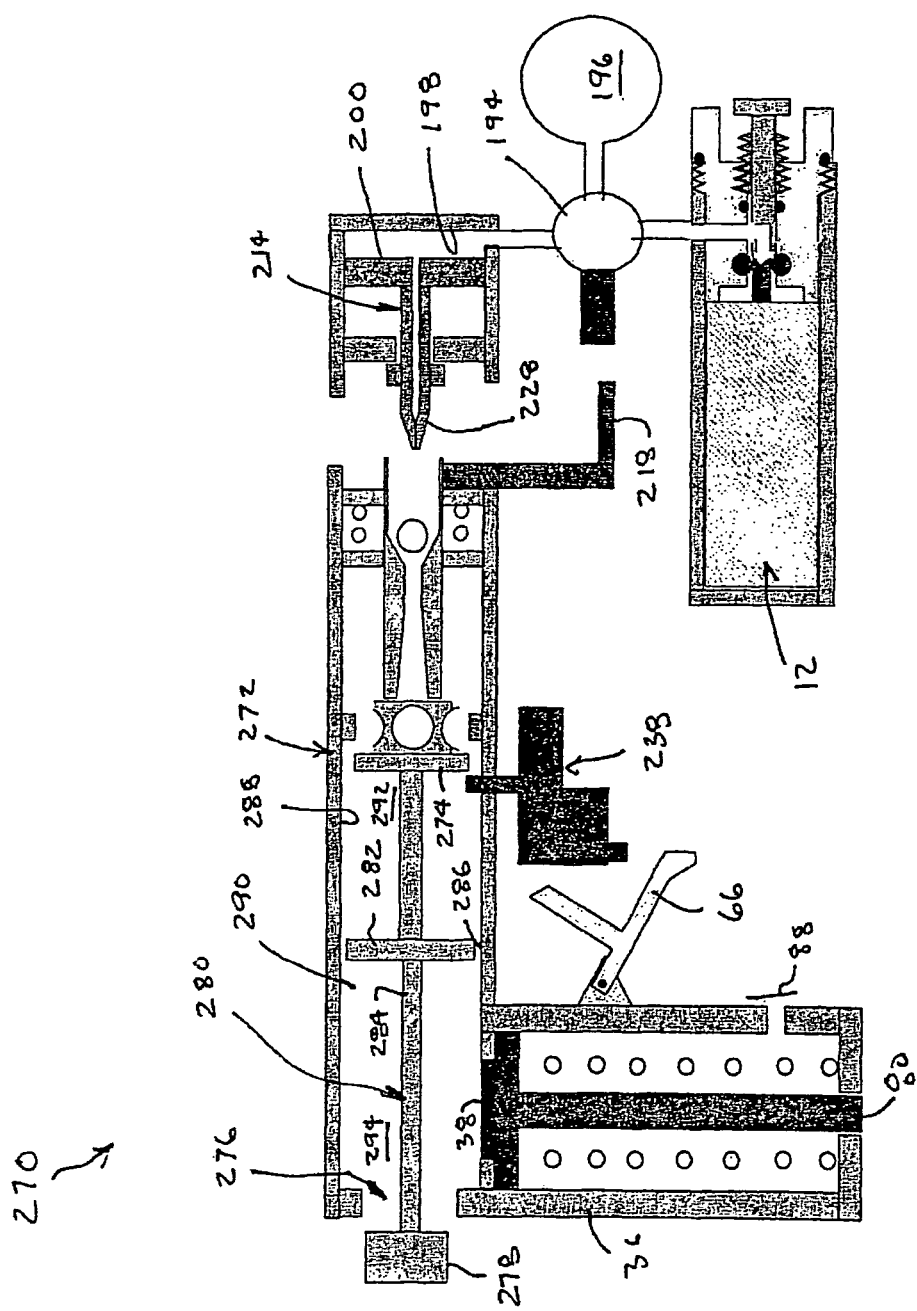
FIG. 24 is a schematic cross-sectional layout of an automatic fuel-pressure actuated gas-powered tool with a modified spool valve having a control plate movable together with the spool valve.

FIG. 24 depicts an alternative tool motor 270 featuring a modified spool valve 280 with a control plate 282 fixed to a tie rod 284 between intake and exhaust closure members 274 and 278 of intake and exhaust valves 272 and 276. The control plate 282 can be sized for forming a gap 286 between the control plate 282 and a housing wall 288 of a combustion chamber 290 to permit limited flows between a pre-combustion chamber portion 292 and a main combustion chamber portion 294 of the combustion chamber 290. Limited size openings could also be provided through the control plate 282 to support the desired limited flows between the combustion chamber portions 292 and 294. Although a partition position between the combustion chamber portions 292 and 294 differs between the open and closed positions of the intake and exhaust valves 272 and 276, the combustion chamber portions 292 and 294 can be relatively sized as desired for two-stage combustion at the closed positions of the intake and exhaust valves 272 and 276.

Figure 25:
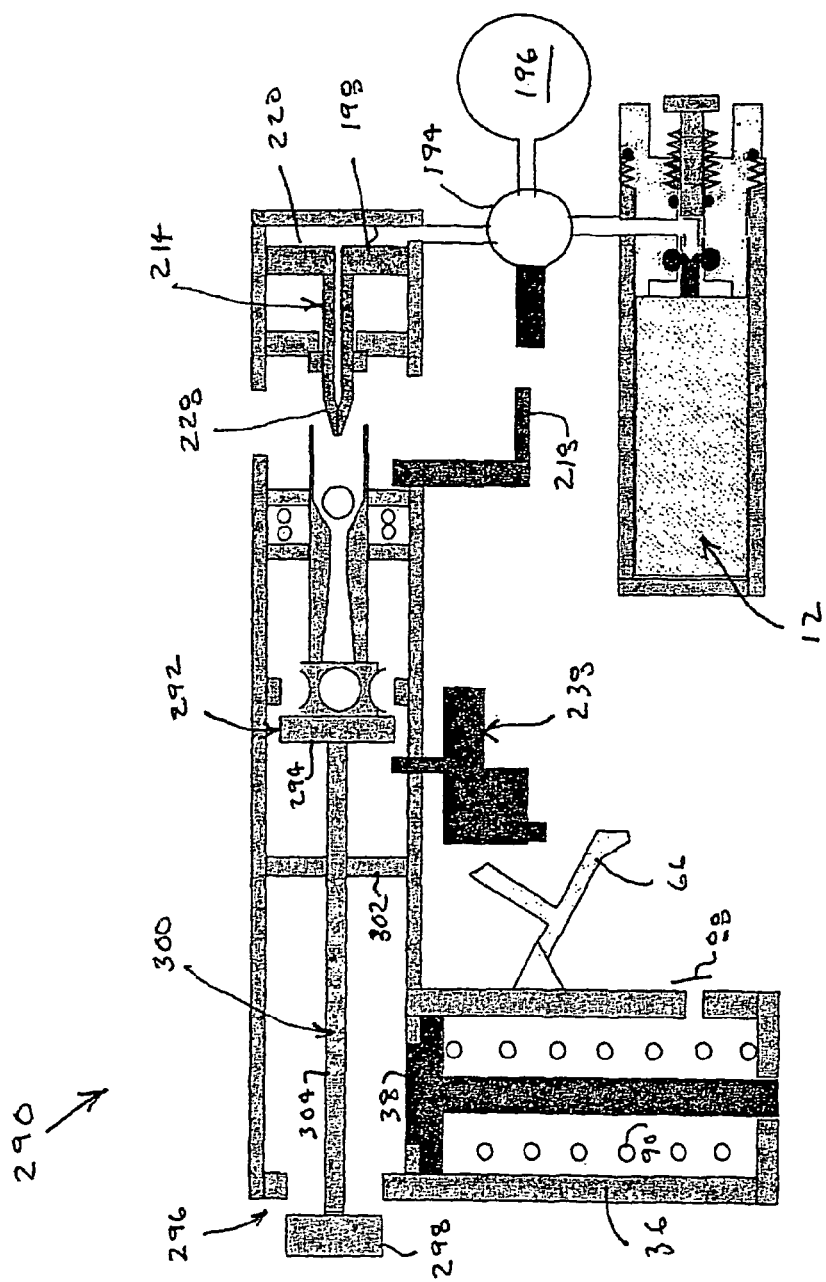
FIG. 25 is a schematic cross-sectional layout of an automatic fuel-pressure actuated gas-powered tool having a control plate that is fixed within a combustion chamber and through which the spool valve can be guided.

FIG. 25 depicts an alternative tool motor 290 featuring a modified spool valve 300 with a control plate 302 fixed to a housing wall 308 of a combustion chamber 310. The control plate 302 divides the combustion chamber 310 into a pre-combustion chamber portion 312 and a main combustion chamber portion 314. Openings (not shown) through the control plate 302 support limited air flows between the two combustion chamber portions 312 and 314. A tie rod 304 passes through the control plate 302 for interconnecting an intake closure member 294 of an intake valve 292 with an exhaust closure member 298 of an exhaust valve 296. That is, the tie rod 304 preferably slides without restriction through the control plate 302 for opening and closing the valves 292 and 296. In fact, the control plate 302 can provide a bearing support for the tie rod 304, or a clearance gap can be provided between the control plate 302 and the tie rod 304 to support the desired limited flows between the two combustion chamber portions 312 and 314.

Having described the invention in general senses and with respect to a number of different embodiments, those of skill in the art will appreciate various further additions or modifications that can be made for practicing the invention within the overall teaching provided.

The invention claimed is:

1. An integrated valving and combustion control system for a gas-powered hand tool having a positive displacement device for accomplishing work, comprising:
    a combustion chamber having a-pre-combustion chamber and a main combustion chamber;
    an intake valve for regulating flows into the pre-combustion chamber when said intake valve is moved between open and closed positions;
    a control valve for permitting limited flows between the pre-combustion chamber and the main combustion chamber when said control valve is moved between first and second positions;
    an exhaust valve for regulating flows out of the main combustion chamber when said exhaust valve is moved between open and closed positions; and
    a tie rod mechanically interconnecting the intake and exhaust valves and movable together with said intake and exhaust valves in a first direction along a common axis for opening said intake and exhaust valves, and movable together with said intake and exhaust valves in a second opposite direction along said common axis for closing said intake and exhaust valves.

2. The system of claim 1 in which the intake valve includes an intake closure member and the exhaust valve includes an exhaust closure member, and the tie rod provides for moving the intake and exhaust closure members along said common axis for opening and closing the intake and exhaust valves.

3. The system of claim 2, wherein:
    the control valve is connected to the tie rod and is movable together with the intake and exhaust closure members along the common axis.

4. The system of claim 2 in which the combustion chamber is formed within a housing, the control valve is movable within the housing, and the tie rod is connected to and passes through the control valve.

5. The system of claim 2 in which the control valve is formed at least in part by a control closure member, and the tie rod provides for moving the control closure member together with the intake and exhaust closure members along the common axis for opening and closing the intake, control, and exhaust valves.

6. The system of claim 1, in which the control valve is formed at least in part by a control closure member that has an open position and a closed position, and in the closed position permits the limited flows between the pre-combustion chamber and the main combustion chamber while the open position permits less restricted flows of air from the pre-combustion chamber into the main combustion chamber.

7. The system of claim 6 in which the control valve is arranged as a check valve that permits the limited air flows from the pre-combustion chamber into the main combustion chamber when the control check valve is disposed at the closed position while blocking air flow from the main combustion chamber into the pre-combustion chamber when the control check valve is disposed at the closed position.

8. The system of claim 1 further comprising a trigger and a linkage connecting the trigger to the tie rod so that depression of the trigger moves the tie rod for closing the intake and exhaust valves.

9. The system of claim 1 further comprising a solenoid connected to the tie rod for collectively opening or closing the intake and exhaust valves.

10. The system of claim 1 further comprising a fluid power actuator connected to the tie rod for collectively opening or closing the intake and exhaust valves.

11. The system of claim 10 in which the fluid power actuator is connected to the combustion chamber and is powered by combustion pressures generated within the combustion chamber.

12. The system of claim 10 in which the fluid power actuator is connected to a fuel pressure source and is powered by fuel pressure.

13. A gas-powered tool motor comprising:
    a combustion chamber including an intake valve at one end, an exhaust valve at another end, and a control valve between two portions of the combustion chamber;
    an intake manifold for delivering a fuel and air mixture to the combustion chamber through the intake valve;
    a positive displacement device in communication with the combustion chamber and displaceable in response to expanding combustion gases from the combustion chamber;
    the intake, control, and exhaust valves including closure members that are movable along a common axis in tandem between collective open positions for recharging the combustion chamber with the fuel and air mixture and collective closed positions for detonating the fuel and air mixture in the combustion chamber and for displacing the positive displacement device; and
    wherein the closure members of the intake, control, and exhaust valves are mounted upon a common tie rod that is translatable in opposite directions along the common axis for opening and closing the valves.

14. The motor of claim 13 in which seats of the intake, control, and exhaust valves project from an interior wall of the combustion chamber, and the closure members are collectively moved toward the seats for closing the valves and are collectively moved away from the seats for opening the valves.

15. The motor of claim 14 in which the closure member of the control valve is resiliently displaceable from the seat of the control valve in a closed position of the control valve for permitting flows from a first of the portions of the combustion chamber to a second of the portions of the combustion chamber while preventing flows from the second portion of the combustion chamber to the first portion of the combustion chamber.

16. The motor of claim 13 in which the control valve provides for limited air flows from a first of the portions of the combustion chamber to a second of the portions of the combustion chamber in the closed position of the control valve.

17. The motor of claim 16 in which the control valve in the closed position includes one or more openings for permitting the limited air flows between the first and second portions of the combustion chamber.

18. The motor of claim 16 in which the control valve in the closed position includes a check valve that permits limited air flows from the first portion of the combustion chamber to the second portion of the combustion chamber while blocking air flow from the second portion of the combustion chamber to the first portion of the combustion chamber.

19. The motor of claim 13 including a common actuator for moving the closure members of the intake, control, and exhaust valves along the common axis between collective open and closed positions.

20. The motor of claim 19 in which a biasing mechanism exerts a biasing force for moving the closure members of the intake, control, and exhaust valves in a first direction along the common axis and the common actuator overcomes the biasing force for moving the closure members of the intake, control, and exhaust valves in a second direction along the common axis.

21. The motor of claim 20 in which the common actuator includes a mechanical linkage connected to a trigger so that when the trigger is depressed, the intake, control, and exhaust valves are collectively closed.

22. The motor of claim 19 in which the common actuator is a fluid power actuator powered by atone of combustion pressures generated within the combustion chamber and fuel pressures generated within a fuel supply.

23. The motor of claim 19 in which the common actuator is a solenoid connected together with an ignition mechanism to an electronic controller.

24. The motor of claim 13 further comprising a thermally conductive housing for a fuel supply and a thermally conductive housing for the combustion chamber, wherein the thermally conductive housing of the fuel supply is thermally connected to the thermally conductive housing of the combustion chamber for cooling the combustion chamber and heating the fuel.

25. A gas-powered tool motor comprising:
a combustion chamber having a pre-combustion chamber and a main combustion chamber;
an intake valve for regulating flows into the pre-combustion chamber when said intake valve is moved between open and closed positions;
a control valve for permitting limited flows between the pre-combustion chamber and the main combustion chamber when said control valve is moved between first and second positions;
an exhaust valve for regulating flows out of the main combustion chamber when said exhaust valve is moved between open and closed positions;
a positive displacement device in communication with the main combustion chamber and displaceable in response to expanding combustion gases from the main combustion chamber; and
a tie rod mechanically interconnecting the intake and exhaust valves, which include closure members, that are movable in tandem and in a first direction along a common axis between collective open positions for recharging the combustion chamber with a fuel and air mixture, and in tandem in a second opposite direction along said common axis between collective closed positions for detonating the fuel and air mixture in the combustion chamber and displacing the positive displacement device.

26. The motor of claim 25 in which the intake valve includes an intake closure member and the exhaust valve includes an exhaust closure member, and the tie rod provides for moving the intake and exhaust closure members along said common axis for opening and closing the valves.

27. The motor of claim 26 in which the control valve is connected to the tie rod and is movable together with the intake and exhaust closure members along the common axis.

28. The motor of claim 26 in which the combustion chamber is formed within a housing, the control valve is movable within the housing, and the tie rod is connected to and passes through the control valve.

29. The motor of claim 26 in which the control valve is formed at least in part by a control closure member, and the tie rod moves the control closure member together with the intake and exhaust closure members along the common axis for opening and closing the intake, control, and exhaust valves.

30. The motor of claim 25 in which the positive displacement device includes a piston with a through bore that receives a speed adjusting pin so that combustion pressures from the combustion chamber (a) initially displace the piston along the speed adjusting pin for advancing a projectile into a barrel and (b) further displaces the piston beyond the speed adjusting pin to allow combustion gases to enter the barrel through the piston bore and propel the projectile through the barrel.

* * * * *